US009110702B2

(12) United States Patent
Reuther et al.

(10) Patent No.: US 9,110,702 B2
(45) Date of Patent: Aug. 18, 2015

(54) VIRTUAL MACHINE MIGRATION TECHNIQUES

(75) Inventors: Lars Reuther, Kirkland, WA (US);
Dustin L. Green, Redmond, WA (US);
John A. Starks, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 364 days.

(21) Appl. No.: 12/792,524

(22) Filed: Jun. 2, 2010

(65) Prior Publication Data

US 2011/0302577 A1 Dec. 8, 2011

(51) Int. Cl.
*G06F 9/455* (2006.01)

(52) U.S. Cl.
CPC .... *G06F 9/45558* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| 5,606,685 | A | * | 2/1997 | Frandeen | 711/117 |
| 6,292,856 | B1 | * | 9/2001 | Marcotte | 710/39 |
| 6,625,713 | B2 | * | 9/2003 | Iida et al. | 711/206 |
| 6,698,017 | B1 | | 2/2004 | Adamovits et al. | |
| 6,941,410 | B1 | | 9/2005 | Traversat et al. | |
| 7,072,919 | B2 | | 7/2006 | Sexton et al. | |
| 7,680,919 | B2 | | 3/2010 | Nelson | |
| 2005/0268298 | A1 | | 12/2005 | Hunt et al. | |
| 2006/0005189 | A1 | | 1/2006 | Vega et al. | |
| 2006/0069761 | A1 | | 3/2006 | Singh et al. | |
| 2006/0195715 | A1 | | 8/2006 | Herington | |
| 2006/0225065 | A1 | | 10/2006 | Chandhok et al. | |
| 2006/0230407 | A1 | | 10/2006 | Rosu et al. | |
| 2007/0204265 | A1 | * | 8/2007 | Oshins | 718/1 |
| 2009/0007106 | A1 | | 1/2009 | Araujo, Jr. et al. | |
| 2009/0064136 | A1 | | 3/2009 | Dow et al. | |
| 2009/0112949 | A1 | * | 4/2009 | Ergan et al. | 707/205 |
| 2009/0300606 | A1 | | 12/2009 | Miller et al. | |
| 2011/0145471 | A1 | * | 6/2011 | Corry et al. | 711/6 |

OTHER PUBLICATIONS

Clark et al., "Live Migration of Virtual Machines", Proceedings of the 2nd conference on Symposium on Networked Systems Design & Implementation, 2, (No Month Available) 2005, 273-286.

Sapuntzakis et al., "Optimizing the Migration of Virtual Computers", ACM SIGOPS Operating Systems Review, Proceedings of the 5th symposium on Operating systems design and implementation, 36(SI), (No Month Available) 2002, 377-390.

Hines, M.R. et al., "Post-copy based live virtual machine migration using adaptive pre-paging and dynamic self-ballooning", VEE'09 Proceedings of the 2009 ACN SIGPLAN/SIGOPS International Conference on Virtual Execution Environments; Washington, DC, USA; Mar. 11-13, 2009, pp. 51-60.

(Continued)

*Primary Examiner* — Gregory A Kessler
(74) *Attorney, Agent, or Firm* — Baker & Hostetler LLP

(57) ABSTRACT

Techniques for migrating a virtual machine from a source computer system to a target computer system are disclosed. In an exemplary embodiment, a group of pages can be mapped writable in response to determining that the guest operating system attempted to change a specific page. In the same, or other embodiments, pages can be compressed prior to sending such that throughput of a communication channel is maximized. In the same, or other embodiments, storage IO jobs can be canceled on a source computer system and reissued by a target computer system.

20 Claims, 15 Drawing Sheets

(56) References Cited

OTHER PUBLICATIONS

"Office Action Issued in Chinese Patent Application No. 201180027388.9", Mailed Date: Jan. 15, 2014, 4 Pages.

"Supplementary Search Report Issued in European Patent Application No. 11790209.8", Mailed Date: Apr. 3, 2014, 7 Pages.

* cited by examiner

VIRTUAL MACHINE MIGRATION TECHNIQUES

BACKGROUND

Virtual machine migration is the process of moving a virtual machine from a source physical computer system to a target physical computer system with as little downtime as possible. The process of moving the virtual machine from one computer system to another does have an impact on the performance of a running guest operating system. For example, when the memory used by the source virtual machine is being transferred to the target computer system execution of the source virtual machine is slowed. This is called a brownout period of the migration operation. The performance degradation occurs due to the fact that a tracking mechanism is needed to track all modifications made to memory of the virtual machine by the running guest operating system. The tracking mechanism typically uses notifications that are raised every time the guest operating system writes to a guest physical page and the processing of these notifications is what slows down execution.

Another source of performance impact is due to the occurrence of a blackout period. The blackout period is the period where the virtual machine is stopped for the transfer. The virtual machine is stopped in order to ensure that that the runtime state remains consistent. During this period, the runtime state of the virtual machine is sent to the target computer system and the virtual machine cannot be used.

Users of the services effectuated by the virtual machine would benefit if the performance impact due to the brownout period is reduced and blackout period was shorted. For example, an administrator could be able to more easily balance workloads on physical computers without worrying about how the blackout and brownout periods affect end users. Accordingly, techniques for reducing the performance impact of both the blackout period and the processing of notifications during the brownout period are desirable.

SUMMARY

In an exemplarily embodiment techniques can be used to reduce the performance degradation during the brownout period and to reduce the length of the blackout period. In an exemplary embodiment, a source computer system can be operable to migrate a virtual machine to a target computer system. In this exemplary embodiment, the source computer system can include instructions that when executed by the source computer system cause a group of pages to be mapped as writable in response to detecting that a guest operating system attempted to change a specific page, wherein the group includes the specific page.

In the same, or another exemplarily embodiment, the source computer system can compress some pages prior to sending them to the target computer system. In the same, or another exemplarily embodiment, the source computer system can cancel issued input/output ("IO") jobs and have them re-issued on the target computer system.

It can be appreciated by one of skill in the art that one or more various aspects of the disclosure may include but are not limited to circuitry and/or programming for effecting the herein-referenced aspects; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
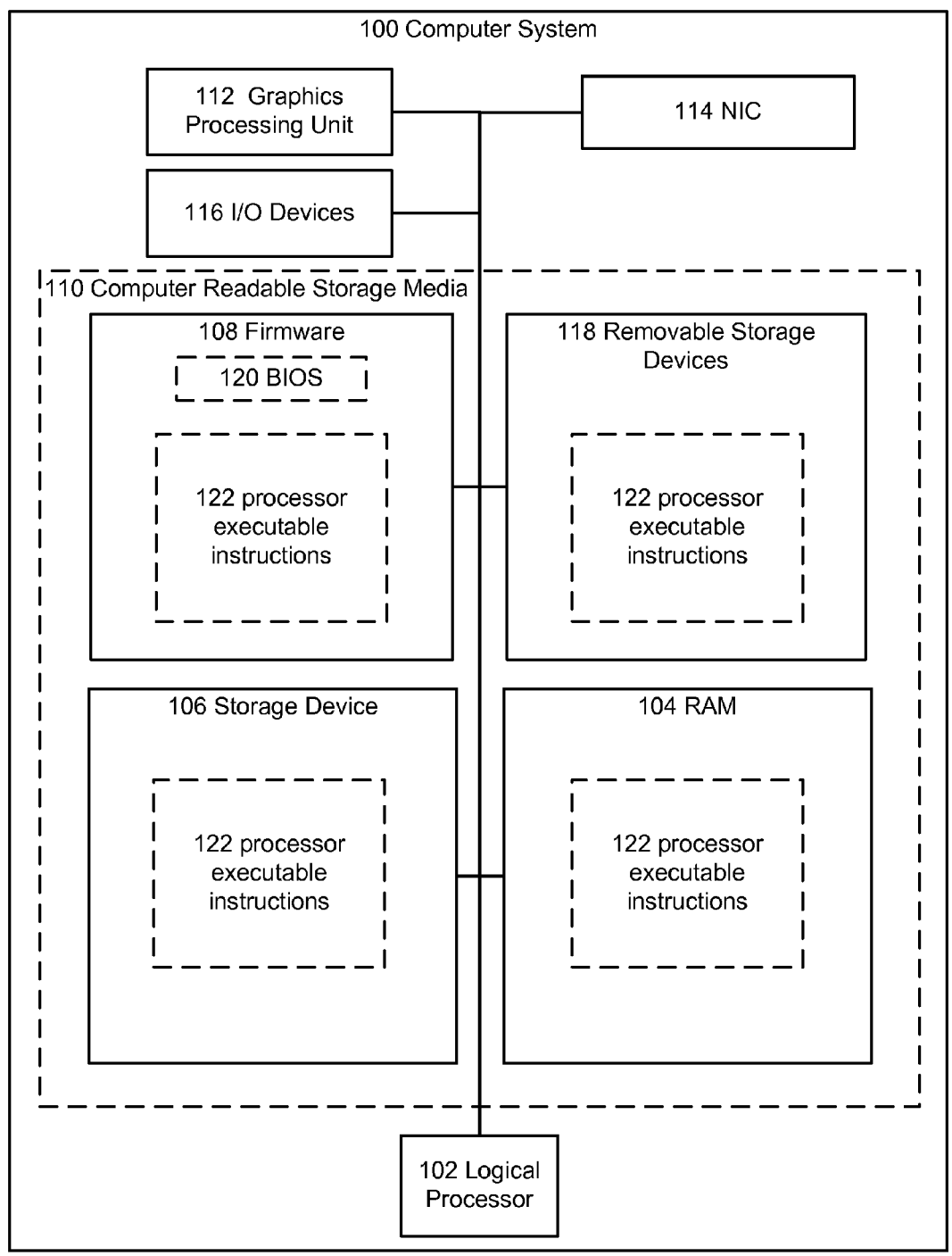
FIG. 1 depicts an example computer system.

The disclosed subject matter may use one or more computer systems. FIG. 1 and the following discussion are intended to provide a brief general description of a suitable computing environment in which the disclosed subject matter may be implemented.

The term circuitry used throughout can include hardware components such as hardware interrupt controllers, hard drives, network adaptors, graphics processors, hardware based video/audio codecs, and the firmware used to operate such hardware. The term circuitry can also include microprocessors, application specific integrated circuits, and/or one or more logical processors, e.g., one or more cores of a multi-core general processing unit configured by firmware and/or software. Logical processor(s) can be configured by instructions embodying logic operable to perform function(s) that are loaded from memory, e.g., RAM, ROM, firmware, and/or mass storage. In an example embodiment where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted.

Computer system 100 can include logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the FIG., various computer-readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer-readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer-readable storage media can be used such as magnetic cassettes, flash memory cards, and/or digital video disks.

The computer-readable storage media 110 can provide non volatile and volatile storage of processor executable instructions 122, data structures, program modules and other data for the computer 100 such as executable instructions that effectuate manager 250 described in the following figures. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to logical processor 102 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit 112. In addition to the display, computers typically include other peripheral output devices, such as speakers and printers (not shown). The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
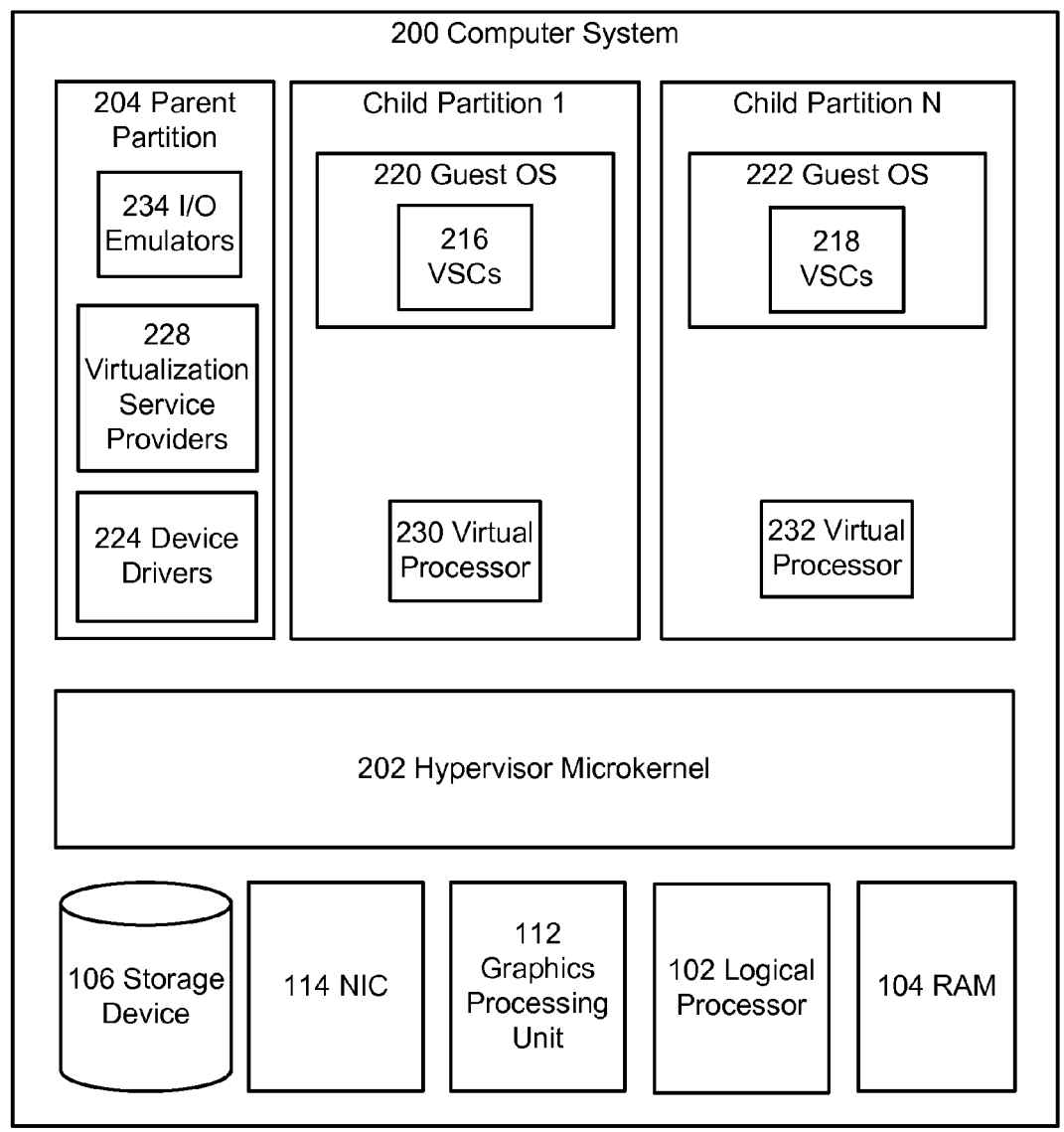
FIG. 2 depicts an operational environment for practicing herein disclosed aspects.

Turning to FIG. 2, hypervisor microkernel 202 can be configured to control and arbitrate access to the hardware of computer system 200. Broadly, hypervisor microkernel 202 can generate execution environments called partitions such as child partition 1 through child partition N (where N is an integer greater than 1). In embodiments, a child partition is the basic unit of isolation supported by hypervisor microkernel 202. Hypervisor microkernel 202 can isolate processes in one partition from accessing another partition's resources, e.g., a guest operating system in one partition may be isolated from the memory of another partition and thus may not be able to detect memory addresses outside of its partition. Each child partition can be mapped to a set of hardware resources, e.g., memory, devices, logical processor cycles, etc., that is under control of the hypervisor microkernel 202. In embodiments hypervisor microkernel 202 can be a stand-alone software product, a part of an operating system, embedded within firmware of the motherboard, specialized integrated circuits, or a combination thereof.

Hypervisor microkernel 202 can enforce partitioning by restricting a guest operating system's view of system memory. Guest physical memory (GPM) is a partition's view of memory that is controlled by hypervisor microkernel 202. System physical memory (SPM) is the memory from the view of hypervisor microkernel 202. Pages are fixed length blocks of memory with starting and ending addresses. System physical memory can be allocated to virtual machines as guest physical memory. Thus, a page of memory allocated to a virtual machine will have a guest physical address (the address used by the virtual machine) and a system physical address (the actual address of the page). The term guest physical memory is a shorthand way of describe a page of memory from the viewpoint of a virtual machine and the term system physical memory is shorthand way of describing a page of memory from the viewpoint of the physical system.

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. Thus, a memory address may have a guest virtual address, a guest physical address, and a system physical address in an exemplary embodiment.

In the depicted example, parent partition component 204, which can also be also thought of as similar to domain 0 of Xen's open source hypervisor is illustrated. Parent partition 204 in this operational environment can be configured to provide resources to guest operating systems executing in the child partitions 1-N by using virtualization service providers 228 (VSPs) that are typically referred to as back-end drivers in the open source community. Broadly, VSPs 228 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

As shown by the figure, emulators 234, e.g., virtualized IDE devices, virtualized video adaptors, virtualized NICs, etc., can be configured to run within the parent partition 204 and attached to resources available to guest operating systems 220 and 222. For example, when a guest OS touches a register of a virtual device or memory mapped to the virtual device microkernel hypervisor 202 can intercept the request and pass the values the guest attempted to write to an associated emulator.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
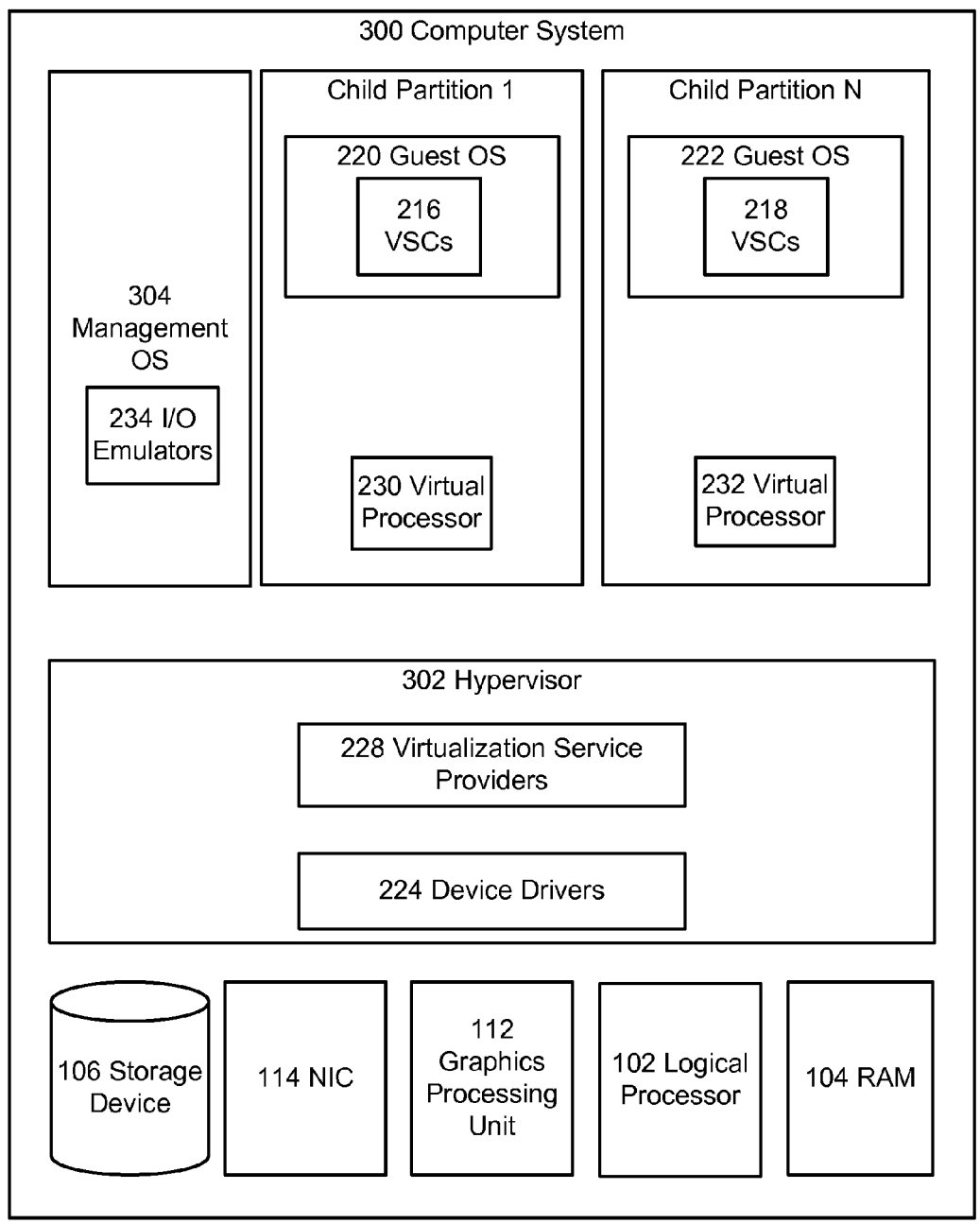
FIG. 3 depicts an operational environment for practicing herein disclosed aspects.

Referring now to FIG. 3, it illustrates an alternative architecture to that described above in FIG. 2. FIG. 3 depicts similar components to those of FIG. 2; however, in this example embodiment hypervisor 302 can include a microkernel component and components similar to those in parent partition 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as hypervisor microkernel 202 of FIG. 2; however, in this architecture hypervisor 304 can be configured to provide resources to guest operating systems executing in the child partitions. Hypervisor 302 of FIG. 3 can be a stand alone software product, a part of an operating system, embedded within firmware of the motherboard or a portion of hypervisor 302 can be effectuated by specialized integrated circuits.

Figure 4:
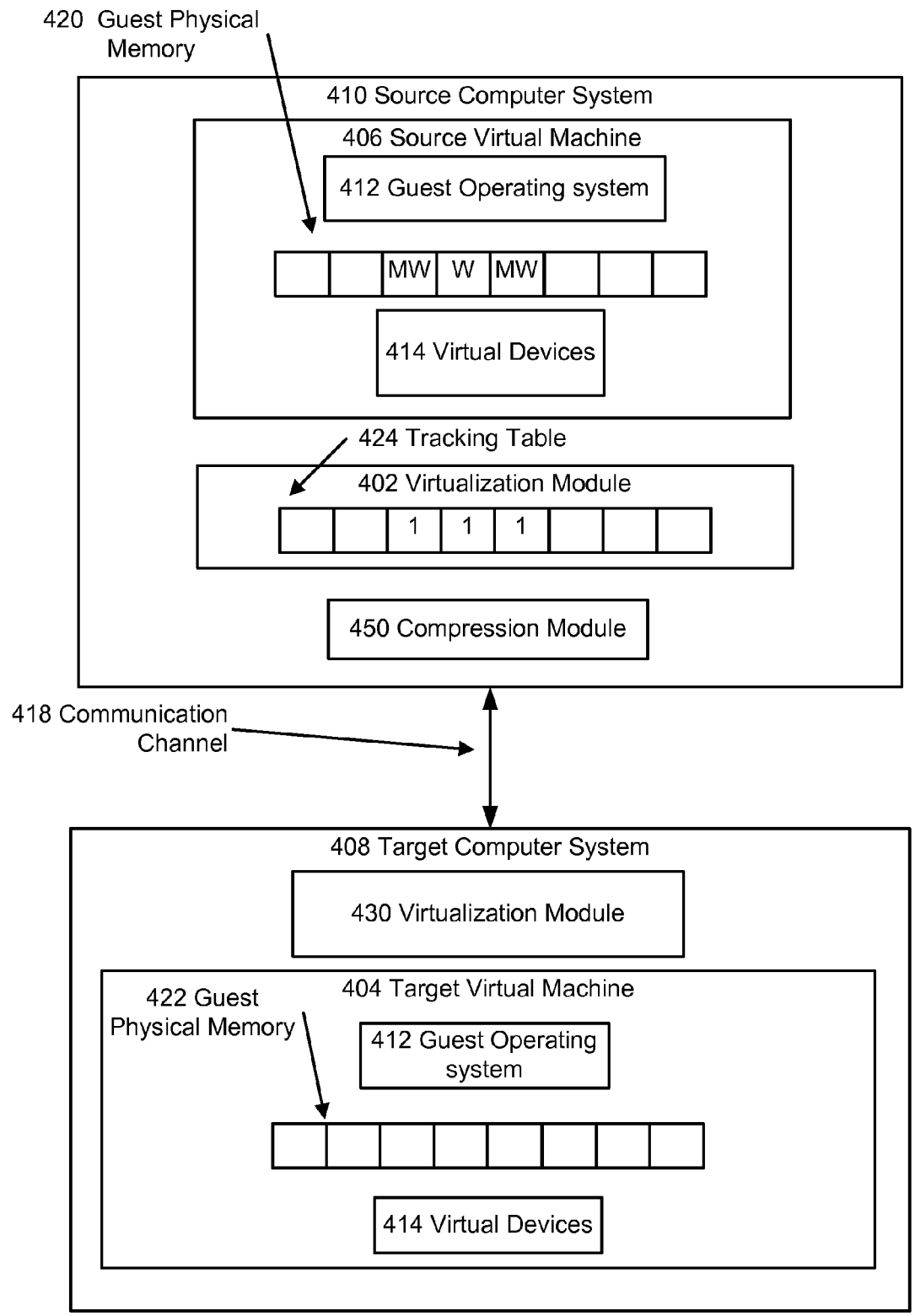
FIG. 4 depicts an operational environment for practicing herein disclosed aspects.

Turning now to FIG. 4, it illustrates an operational environment for discussing techniques used to migrate a guest operating system from a source physical machine to a target physical machine. FIG. 4 shows a source computer system 410 and a target computer system 408 interconnected by a communication channel 418 such as, for example, a channel compliant with the Internet Protocol Suite, commonly called TCP/IP. Each computer system (source or target) can include components similar to computer system 100 of FIG. 1 and could include components illustrated in FIG. 2 or 3. In an exemplary embodiment, guest operating system 412, which can be similar to guest OS 220 or 222 of FIG. 2 or 3, can be executing in source virtual machine 406 and be migrated to target virtual machine 404.

Live migration is the act of migrating an executing virtual machine from one computer system to another with minimal downtime imposed on the virtual machine. In order to migrate, the state of source virtual machine 406, i.e., the contents of its guest physical memory 420, the state of any virtual processors, and the state of its virtual devices, need to be sent to target computer system 408.

As described briefly above, guest physical memory 420 can be arranged into pages, e.g., fixed length blocks of memory that are contiguous both in physical memory addressing and virtual memory addressing, which may be 4 kilobytes in size (circa 2010). When virtualization module 402 (either microkernel 202, parent partition 204, or hypervisor 304) initiates a migration operation, virtualization module 402 can set-up a tracking table 424, for example, a bitmap where each bit corresponds to a page of guest physical memory 420. After the tracking table 424 is set-up, the content of each guest physical page in source computer system 410 can be copied and sent to target computer system 408. For example, virtualization module 402 can cause source computer system 410 to remap a page as read-only; copy the page; and start sending the over to target computer system 408.

When guest operating system 412 attempts to write to a page mapped as read-only, a protection fault will be generated and sent to virtualization module 402. In response, virtualization module 402 can change the page to writable and return control to guest operating system 412, which can now write to the page. In addition, virtualization module 402 can be configured to set a bit in tracking table 424 corresponding to the page guest operating system 412 attempted to change. This concept is illustrated by FIG. 4. For example, guest physical 420 is shown having 8 pages numbered from 0-7 from left to right. In this example, guest operating system 412 attempted to write to guest physical page "3," which is marked with a "W" for "written." (As one of skill in the art can appreciate, "page 3" is shorthand for a guest physical address that represents the start of the page and the number 3 is merely used to clearly illustrate concepts). In response, virtualization module 402 can execute and set a bit in tracking table 424 corresponding to the third page of guest physical memory 420 to identify that the page is now "dirty," e.g., changed from what has been sent to target computer system 408. As one or ordinary skill in the art can appreciate, guest operating system 412 may attempt to write to multiple pages while pages are being sent from source virtual machine 406 to target virtual machine 404. This technique significantly reduces the performance of virtual machine 406 due to the fact that each page that guest operating system 412 attempts to access results in running virtualization module 402 instructions to change the page from read-only to writable.

After a page is sent to target computer system 408, virtualization module 402 can be configured to cause source computer system 410 to check tracking table 424 and determine if any bits are set. Virtualization module 402 can execute and cause source computer system 410 set any pages marked with a bit to read-only; copy the pages; reset the tracking table 424; and resend the pages copied.

In an exemplary embodiment, virtualization module 402 can be configured to remap a group of pages as writable instead of simply the page that guest operating system attempted to change. This technique potentially causes more pages to be sent to target computer system 408; however the inventors of the herein described subject matter discovered that the performance benefit due to individually remapping pages as writable can outweigh the cost due to sending more pages to the target virtual machine 404. This concept is illustrated by FIG. 4. In response to determining that guest operating system 412 attempted to write to the third page (marked with a W), a group of pages including pages 2 and 4 could also be mapped as writable (marked with "MW" to identify that these pages were mapped writable in response to guest operating system attempting to write to a different page). Similarly, bits can be set in tracking table 424, which can cause virtualization module 402 to resend these pages to target computer system 408.

In an exemplary embodiment, each time guest operating system 412 attempts to write to a page, virtualization module 402 can map a group of pages as writable. The pages that form the group can be guest physical pages or guest virtual pages. For example, in a static embodiment, a predetermined number of contiguous pages such as, for example, four or eight can be in a group centered on or starting at, for example, the page guest operating system 412 attempted to change. In another embodiment, the size of the group can be dynamically set based on for example, the number of iterations that virtualization module 402 has re-sent pages, or the number of discrete pages guest operating system attempted to change. In these examples, the group could be centered on the page guest operating system 412 attempted to change or it could be a group of contiguous pages including the page guest operating system 412 attempted to change. The size of the group can be dynamically reduced in this embodiment. Larger groups can be used in earlier iterations to leverage potential locality in the memory access patterns of the guest operating system 412. The group size can be shrunk in later iterations to home in on the set of pages that are actively being changed and to avoid unnecessarily transferring memory.

Figure 5:
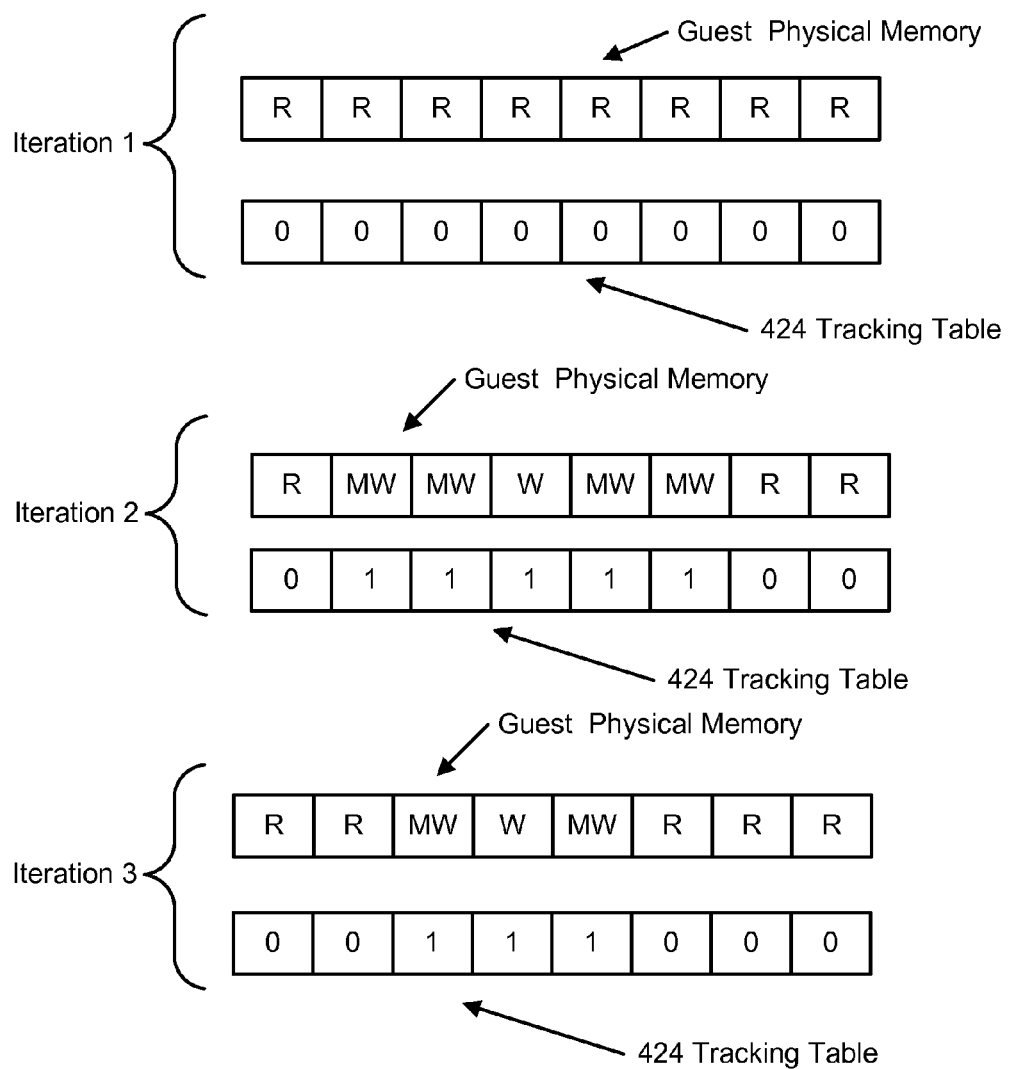
FIG. 5 depicts how an exemplary virtualization module can track changes to memory made by a guest operating system.

Turning briefly to FIG. 5, shows three iterations of a migration pass performed by virtualization module 402. FIG. 5 shows 8 pages of guest physical memory. Each page has an address, and for ease of explanation the addresses are 0-7, reading from left to right and each page can be backed by a page of system physical memory. In the illustrated example, virtualization module 402 has been configured to form groups of pages based on guest physical addresses. For ease of explanation, the group size has been set to 4 for the second iteration and 2 for the third iteration. This illustrates an embodiment where the size of the group is dynamically set. During the initial iteration (iteration 1), virtualization module 402 can map one or more pages as read-only; copy each page mapped as read-only; and then start sending the copies to target computer system 408. Some time during this first iteration, guest operating system 412 may change, for example, guest physical page 3 (indicated with a "W"). As described above, virtualization module 402 can mark a bit that corresponds to guest physical page 3 in tracking table 424 as well as a group of pages, i.e., guest physical pages 1, 2, 4, and 5 as changed.

As shown by the figure, since virtualization module 402 is grouping based on guest physical pages; bits can be set in tracking table 424 for guest physical pages in the group. When the first iteration is complete, virtualization module 402 can execute and cause source computer system 410 to map each page identified in tracking table 424 as read-only; copy the pages; reset tracking table 424; and start resending the pages to target computer system 408. In an exemplary embodiment, the pages can be copied just before they are about to be sent to target computer system 408. In this example, the operations that copy and resend pages can occur per-page or a few pages at a time.

Continuing with the description of FIG. 5, while virtualization module 402 is sending the pages identified after iteration 1 to target computer system 408, guest operating system 412 could change, for example, guest physical page 3 again. In this example, virtualization module 402 could again map a group of pages as changed (in this iteration 2 pages instead of 4). As illustrated by the figure, guest physical page 3 can be marked as changed in tracking table 424. Similarly, guest physical page 2 and 4 can be marked as changed in tracking table 424. When the second iteration is complete, virtualization module 402 can execute and cause source computer system 410 to resend the pages identified by tracking table 424. This process could continue until, for example, a maximum number of iterations occur or the number of pages marked as dirty is less than a predetermined value.

While each iteration is shown as a cycle of remapping as read-only; copying dirty pages; clearing tracking 424; and sending pages, nothing in the disclosure limits virtualization module 402 from operating in such a manner. Instead, this process is used for illustration purposes. Therefore, in an exemplary embodiment virtualization module 402 can be configured to operate on batches of pages or individual pages. In this exemplary embodiment, virtualization module 402 can be configured to remap a batch of pages as read-only; copy the batch of dirty pages; clear tracking 424; and send the batch to target computer system 408. In another exemplary embodiment, when a group of pages is mapped from read-only to writable, virtualization module 402 can be configured to start remapping these pages as read-only and copying them before continuing on to other pages.

Figure 6:
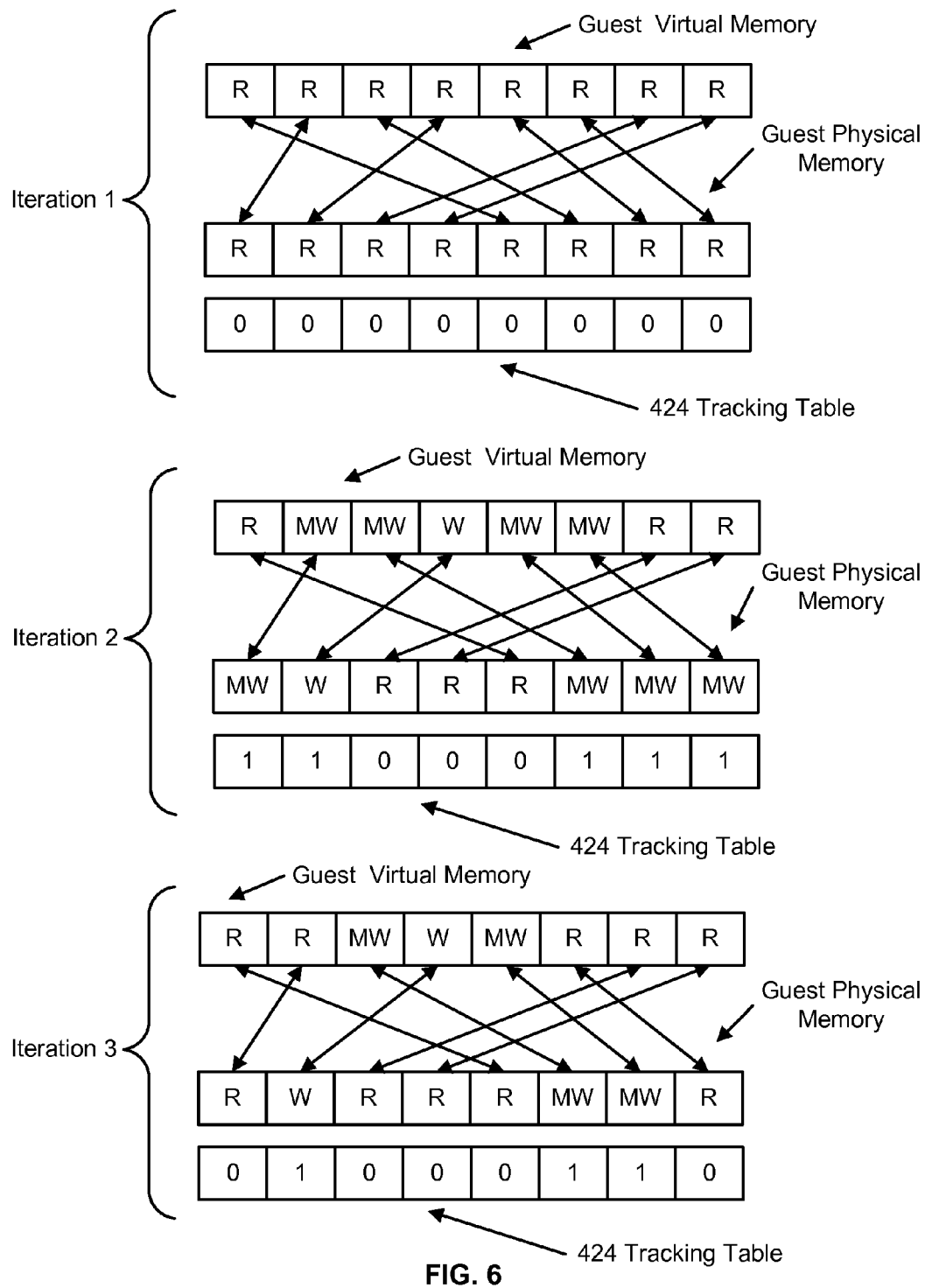
FIG. 6 depicts how an exemplary virtualization module can track changes to memory made by a guest operating system.

Turning briefly to FIG. 6, it shows that in an embodiment where virtualization module 402 forms groups of pages based on guest virtual memory. In the illustrated example, when guest virtual page 3 is changed during iteration 1, a group of pages can be selected based on the guest virtual address of guest virtual page 3. For example, a group of 4 pages near guest physical page 1 can be marked as changed. This example is more computationally difficult because the page table mapping guest physical pages to guest virtual pages needs to be accessed.

Turning back to FIG. 4, after a predetermined number of iterations or the number of dirty pages is less than a threshold, virtualization module 402 can stop virtual machine 406, i.e., the virtual processor is stopped and source virtual machine 406 enters the blackout period, and send any remaining pages identified in tracking table 424 to target computer system 408 along with state information for virtual devices 414. The state information for virtual devices 414 can include, for example, the state of the virtual processors in virtual machine 406, the state of virtual devices, e.g., emulators, VSPs, a virtual NIC, a virtual video adaptor, VSCs, etc.

Compression operations can be performed by compression module 450. Compression is a computationally expensive operation thus, in situations where throughput is key, (such as in a migration operation) it is not typically used. In an exemplary embodiment; however, compression can be performed when there is enough data (pages of memory and state information) to reach a bit-rate-target set to, for example, a saturation point of the network card. For example, in the instance where logical processor cycles are available and uncompressed pages are ready to be sent, compression can be used. In this case, the network connection can be saturated with data and compression can be used to increase the effective throughput given the same amount of data (per second) on the network.

In a specific exemplary embodiment, compression module 450 can be configured to run on a low priority thread and only run when a logical processor is otherwise idle. In this example, a bit-rate-target can be set and virtualization module 402 can be configured to send data, e.g., pages of guest physical memory and/or state information, to the network adaptor in order to reach this target. In an exemplary embodiment, when virtualization module 402 needs more data to send, it can be configured to check compression module 450 first to see if compressed data is available. In the instance that no compressed data is available, virtualization module 402 can select uncompressed data to send. During the compression operation, the data is not available for sending, so at the end of the process, the last pages still being compressed need to be waited for compression to be completed (very brief wait), and then sent. Overall, this compressing technique increases the effective transfer rate.

Once target virtualization module 430 receives the pages and state information for virtual device 414, virtualization module 430 can configure states of virtual devices 414 on target virtual machine 404 to reflect received state information and copy the received pages into guest physical memory 422. In the instance where a page is re-sent, virtualization module 430 can cause the content in the re-sent page to be written in the page thereby overwriting content already present. When enough of the content is copied into guest physical memory 422, a virtual processor in the target virtual machine 404 can be restarted and start running guest operating system 412.

Figure 7:
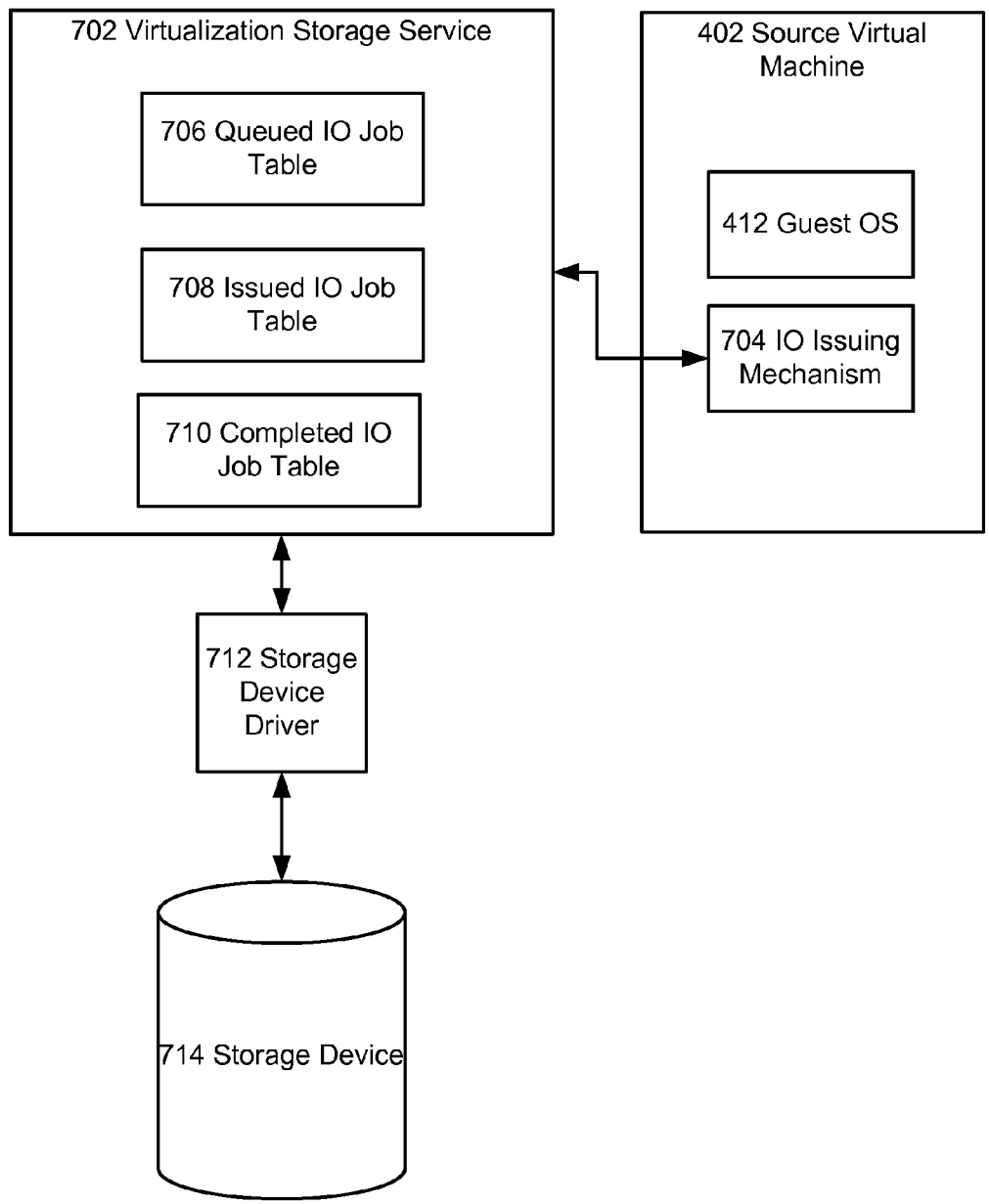
FIG. 7 depicts an operational environment for practicing herein disclosed aspects.

Referring to FIG. 7, it illustrates an environment used to illustrate techniques for obtaining the state of a virtualization storage service, i.e., a virtual device. FIG. 7 illustrates a virtualization storage service 702, which can be a module of executable instructions that is operate within, for example, hypervisor 304 or parent partition 204. Virtualization storage service 702 can handle storage requests on behalf of virtual machines by issuing the requests to physical storage devices such as storage device 714 via a storage device driver 712. Briefly, storage device 714 could be local to source computer system 410; it could be a Storage Area Network ("SAN") target, a networked file system, etc.

Continuing with the description of FIG. 7, IO issuing mechanism 704 can be used by guest operating system 412 to issue IO jobs. In an exemplary embodiment, IO issuing mechanism 704 can be a virtualization service client similar to that described above. In this exemplary embodiment, IO issuing mechanism 704 can send high level storage requests to virtualization storage service 702 via a message passing channel. For example, the IO issuing mechanism 704 can send small computer system interface ("SCSI") commands to virtualization storage service 702. This technique allows the virtual machine to access virtualization storage service 702 faster than when emulation is used.

In an alternative embodiment, an IO controller emulator can execute within, for example, hypervisor 304 or parent partition 204. In this example, IO controller emulator can be attached to a plurality of registers and memory mapped IO space of source virtual machine 406 such that access to these resources is trapped and redirected to IO controller emulator. In this example, IO issuing mechanism 704 can be thought of as backing the registers and memory mapped IO space that guest operating system 412 attempts to access. For example, a register accessed via an IO port, can be used identify whether an IDE emulator is the primary or secondary IDE channel, to mask interrupts, to start a transaction, etc. In this embodiment, virtualization module 402 can set traps on these ports and if a driver in guest operating system 412 attempts to write to what acts like a hardware port, virtualization module 402 can trap on the register access, e.g., intercept the register access, stop the virtual processor running the driver, and pass what was written to the register to the IO controller emulator. The IO controller emulator can then be executed and take an action. For example, the IO controller emulator can send an IO job to virtualization storage service 702 to, for example, read a block of data.

As shown by the figure, virtualization storage service 702 can maintain tables 706, 708, and 710, which can be used to store information about the IO jobs it is currently handling. In an exemplary embodiment, each table can be a data structure such as a linked-list in memory and information about the incoming IO jobs can be stored therein. Queued IO job table 706 can store information about IO jobs it has received from virtual machine 406, but has not yet issued to storage device 714. For example, when an IO job is received, e.g., a request to read a sector of a hard drive, it can be queued in queued IO job table 706 until it can be issued to the storage device 714. FIG. 7 also shows that an issued IO job table 708 can be maintained by virtualization storage service 702. This table can track the IO jobs that have been issued, but have not yet been completed by the physical storage device 714. When virtualization storage service 702 issues a job, storage device driver 712 executes and causes the IO job to be sent to storage device 714. At this point, the storage device 714, which may have its own internal queue, determines how to complete IO jobs in the most efficient manner. Also shown is a completed IO job table 712. This table can store information about IO jobs that have been completed, but have not been reported back to source virtual machine 406.

In an exemplary embodiment, the state of the virtual devices, e.g., the state of virtualization storage service 702, needs to be migrated to target computer system 408 so that target virtual machine 404 can be instantiated correctly. Thus, the information in tables 706-710 needs to be copied to target virtual machine 404. Prior to this invention, in order to ensure consistency between the runtime state and the state of virtual devices such as virtualization storage service 702, all outstanding, i.e., issued, IO jobs needed to be finished before the state could be transferred from source computer system 410 to target computer system 408 during the blackout period. This is done by waiting for the completion of all outstanding IO jobs after source virtual machine 406 has been stopped. This wait; however, significantly increased the duration of the blackout period in the instance where a large number of IO jobs were outstanding or storage device 714 was busy handling IO jobs from multiple virtual machines.

Figure 8:
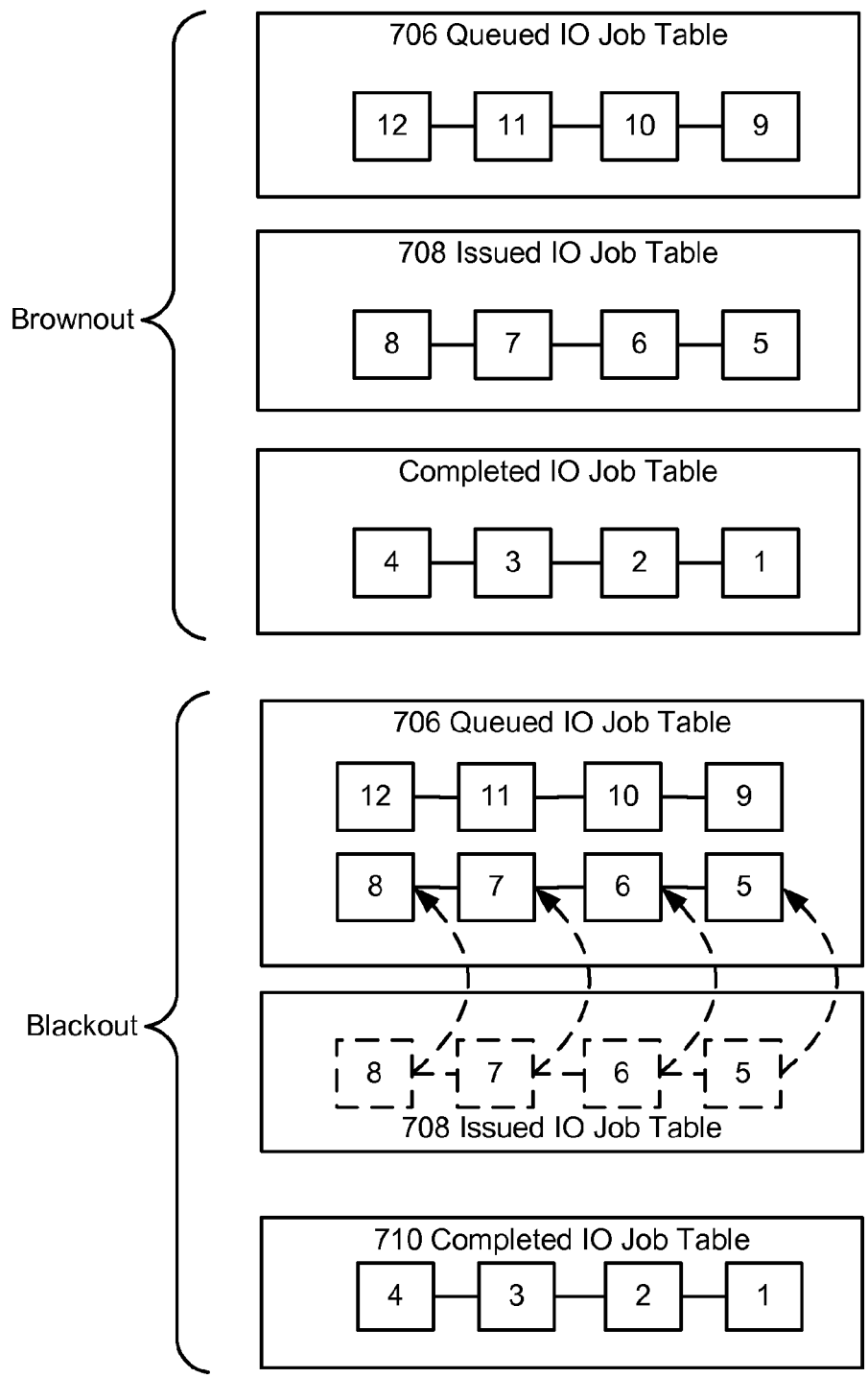
FIG. 8 depicts an operational environment for practicing herein disclosed aspects.

Turning to FIG. 8, it illustrates a technique for quickly migrating the state of virtualization storage service 702 without having to wait for all the outstanding IO jobs to complete. FIG. 8 shows tables 706-710 at two points in time including IO jobs 1-12, In this example, the IO jobs currently issued to storage device 714, but have not yet been completed, i.e., the outstanding IO jobs, can be moved from the issued IO job table 708 to the queued IO job table 706. The result of this operation is the issued IO job table 708 has been empted and now the state of virtualization storage service 702 can be immediately sent to target computer system 408. This is illustrated by the arrows and dashed lines indicating that IO jobs 5-8 have been moved back up into queued IO job table 706. The affect of this operation is that a virtualization storage service on the target computer system 408 will re-issue IO jobs 5 through 8; however, as identified by the inventors of the herein disclosed subject matter, since read operations and write operations are not guaranteed to occur in any particular order, it does not matter what order IO jobs are sent to storage devices or that IO jobs are sent multiple times.

For example, when an IO job is a write operation, it is permissible to have a storage device perform the same IO job multiple times. For read operations, since the order that read operations are performed by the storage device is not guaranteed, no assumptions are made about what is stored in a memory location. Thus, if a read IO job is performed twice, only after it is actually completed and reported back to the guest operating system can the guest configure itself to rely on information stored in that memory location. Thus, in this embodiment, a state of virtualization storage service 702 that can be used by target computer system can be quickly obtained without having to wait for the issued jobs to finish. In this exemplary embodiment, the state for virtualization storage service 702 is not the same as the state sent to target virtual machine 404; however it is functionally equivalent due to the natural characteristics of storage.

Since the IO jobs are still in fact outstanding; in an exemplary embodiment virtualization storage service 702 can attempt to cancel the outstanding IO jobs after the state of virtualization storage service 702 is sent to target computer system 408. In this exemplary embodiment, virtualization storage service 702 can send signals to storage device 714 requesting that IO jobs 5-8 be canceled. Some IO jobs may be canceled, others may already be in the process of being completed and cannot be canceled. After the IO jobs are canceled or completed, control of storage device 714 can be transferred to target virtual machine 404. In this configuration, the source computer system 408 only has to wait for the IO jobs that cannot be canceled, which are typically a small set of IO jobs that were actively being processed by storage device 714. Moreover, since a workable state of virtualization storage service 702 was quickly obtained and sent to target computer 410, a virtualization storage service on target computer system 410 can be configured while virtualization storage service 702 is waiting for the IO jobs that could not be canceled to complete.

The following are a series of flowcharts depicting operational procedures. For ease of understanding, the flowcharts are organized such that the initial flowcharts present implementations via an overall "big picture" viewpoint and subsequent flowcharts provide further additions and/or details. Furthermore, one of skill in the art can appreciate that the operational procedure depicted by dashed lines are considered optional.

Figure 9:
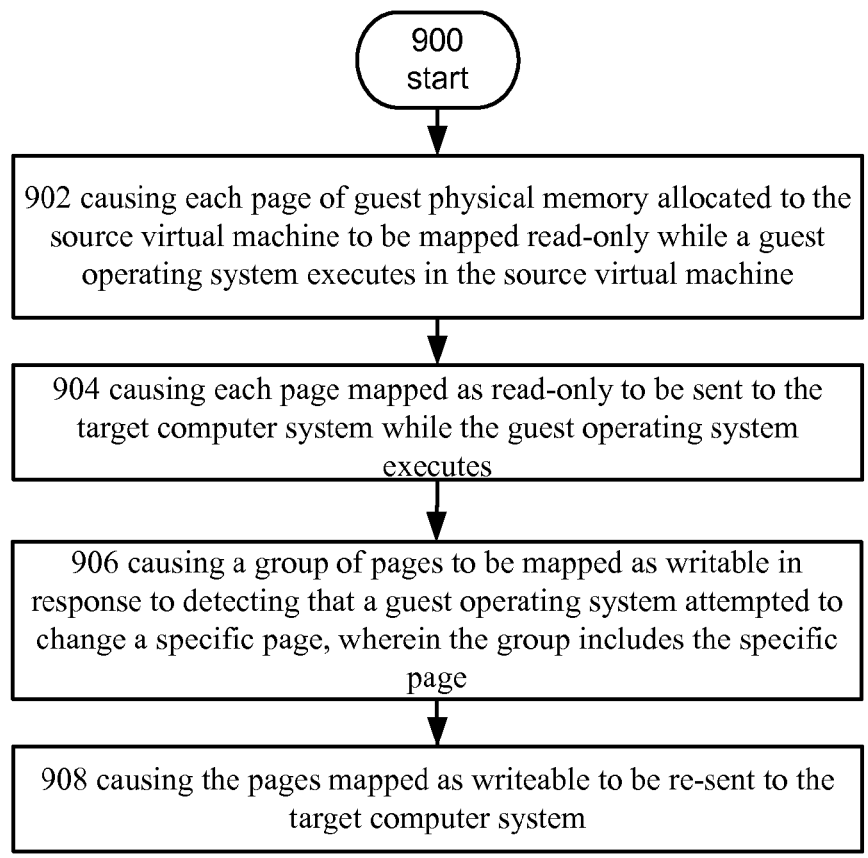
FIG. 9 depicts an operational procedure.

Turning now to FIG. 9, it illustrates an operational procedure. Operation 900 begins the operational procedure and operation 902 illustrates causing each page of guest physical memory allocated to the source virtual machine to be mapped read-only while a guest operating system executes in the source virtual machine. In an exemplary embodiment, virtualization module 402, e.g., hypervisor 302 or microkernel 202, can mark each page as read-only prior to the pages being sent to the target computer system 408. If a guest operating system 412 attempts to change a page, e.g., by writing to the page, that has been marked as read-only, a page fault will occur and virtualization module 402 will be notified. For example, after virtualization module 402 maps guest physical memory 420 as read-only it can copy a plurality of pages. In an exemplary embodiment, virtualization module 402 can map guest physical memory pages in batches or virtualization module 402 can serially map pages.

Prior to performing a migration operation, communication channel 418 such as a TCP/IP based communication channel can be established between source computer system 410 and target computer system 408. Configuration information such as the number of virtual processors needed, the amount and layout of guest memory, and other characteristics of source virtual machine 406 can be passed to target computer system 408. Virtualization module 430 can then receive a signal indicating that a migration operation will be performed, and can instantiate target virtual machine 404, i.e., allocate guest physical memory 422, load virtual devices 414 and virtual processors, etc. After target virtual machine 404 is instantiated, pages of guest physical memory can be sent to target virtual machine 404.

Continuing with the description of FIG. 9, operation 904 shows causing each page mapped as read-only to be sent to the target computer system while the guest operating system executes. For example, and turning to FIG. 4, virtualization module 402, which can comprise executable instructions, can be executed by a logical processor and cause pages of guest physical memory 420 allocated to source virtual machine 406 to be sent to target computer system 408. Guest operating system 412 can be actively executing while pages of guest physical memory 420 are transferred to target computer system 408. Or put another way, a scheduler in guest operating system 412 can be actively scheduling threads to run on one or more virtual processors of source virtual machine 406. Because of this, guest operating system 412 can actively change the contents of guest physical memory 420. In this example, virtualization module 402 can be configured to serially copy each page of guest memory, or operate on batches of pages as described above.

Operation 906 of FIG. 9 shows causing a group of pages to be mapped as writable in response to detecting that a guest operating system attempted to change a specific page, wherein the group includes the specific page. Continuing with the foregoing example, in the instance that guest operating system 412 attempts to write to a page, a notification can be sent to virtualization module 402 that indicates the address of the page. In response to the notification, virtualization module 402 can mark a bit in tracking table 424 that corresponds to the address of the page and remap the page as writable for virtual machine 406. At this point guest operating system 412 can write to the page.

In an exemplary embodiment, instead of just mapping the specific page, virtualization module 402 can remap a group of pages that includes the specific page as writable. Virtualization module 402 can use any technique for selecting a group of pages. For example, a group of contiguous pages centered on the specific page could be selected to be part of the group. In another embodiment, virtualization module 402 can form a group of pages starting from the address of the specific page. In an embodiment, in response to the notification that indicates the address of the specific page, virtualization module 402 can execute and retrieve a number from memory that indicates how many additional pages should be in the group. In an exemplary embodiment, virtualization module 402 can retrieve the value; determine the addresses of a group of pages to map as writable based on the address of the changed page and the number; remap the group of pages as writable; and set bits in tracking table 424 indicating that the group of pages are to be considered dirty. In an exemplary embodiment, the number of additional pages to remap can be static or dynamically calculated based on current conditions.

Turning to operation 908, it shows causing the pages mapped as writeable to be re-sent to the target computer system. For example, the pages marked as writable can be re-sent to target computer system 408 via a network adaptor of source computer system 410. For example, virtualization module 402 can check tracking table 424 in order to determine whether any pages have changed since they were copied. In the instance that pages have changed, virtualization module 402 can remap them as read-only; reset bits in tracking table 424 corresponding to the pages; copy the pages; and send the page to target computer system 408. As described above, virtualization module 402 can be configured to check tracking table 424 at any time during the migration operation. For example, virtualization module 402 could serially copy and send pages and then check tracking table 424 (similar to the operation described in FIGS. 5 and 6), or virtualization module 402 can opportunistically check tracking table 424 such as, for example, in response to a protection fault.

Figure 10:
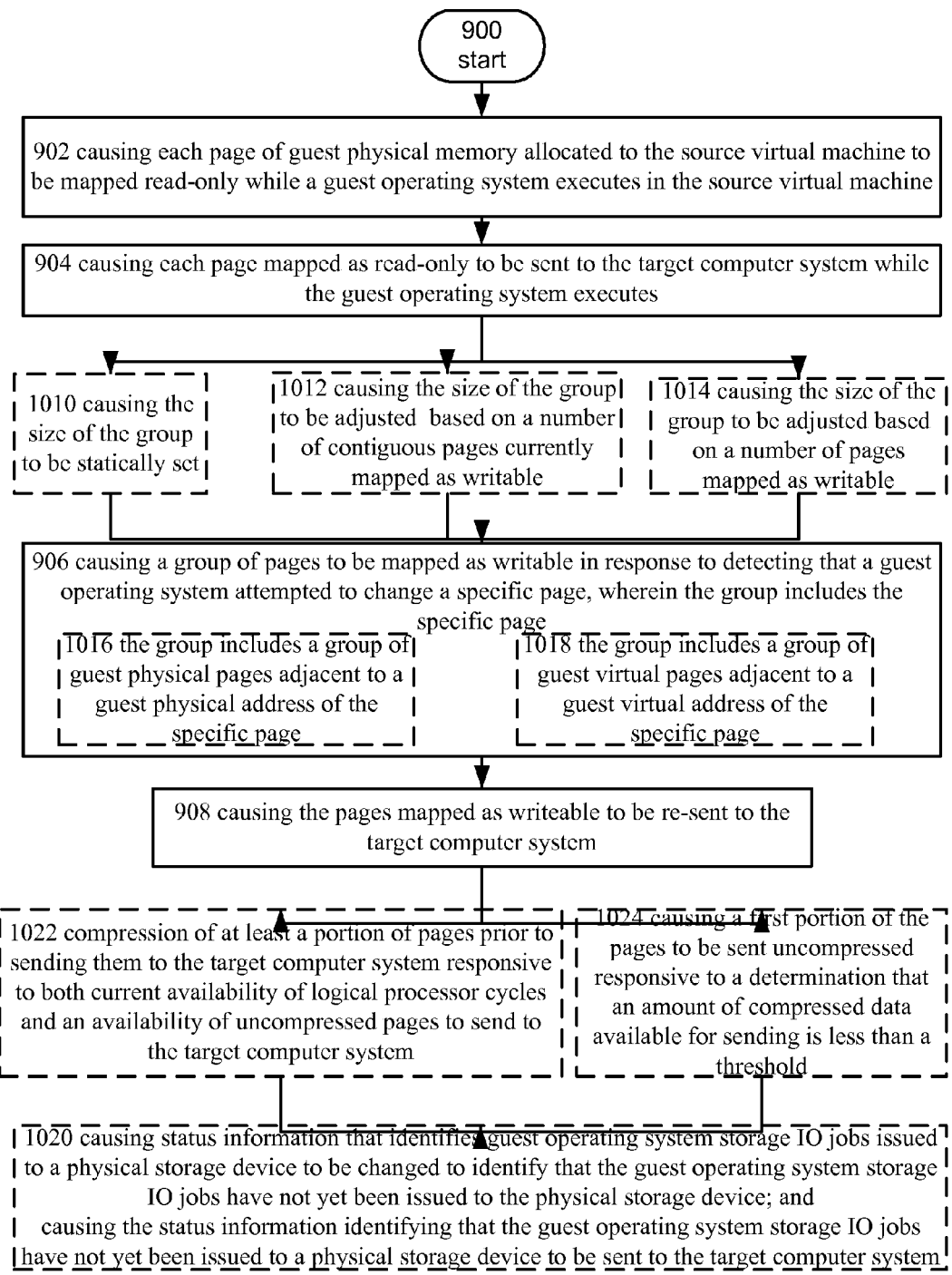
FIG. 10 depicts an alternative embodiment of the operational procedure of FIG. 9.

FIG. 10 illustrates an alternative embodiment of the operational procedure of FIG. 9 including operations 1010-1024. Operation 1010 shows causing the size of the group to be statically set. For example, in an embodiment the number used by virtualization module 402 to set the size of the group can be statically assigned. In an exemplary embodiment, virtualization module 402 can statically set the size of the group prior to initiating a migration operation. In this exemplary embodiment, the size of the group can be set on the amount of guest physical memory allocated to the source virtual machine and/or the bandwidth of the communication channel 418.

Continuing with the description of FIG. 10, operation 1012 shows causing the size of the group to be adjusted based on a number of contiguous pages currently mapped as writable. For example, the size of the group can be dynamically set based on the number of pages contiguous to the specific page mapped as writable. In this example embodiment, the size of the group can increase and decrease based on the number of contiguous pages mapped as writable in tracking table 424. For example, virtualization module 402 can be configured to adapt the size of the group based on the number of contiguous pages marked as writable when tracking table 424 is accessed. In this exemplary embodiment, a first page may be changed by guest operating system 412 and the first page may be mapped writable. If, for example, guest operating system 412 changes a contiguous page, virtualization module 402 can determine that the first page is mapped writable and adapt the size of the group from 1 page to N pages (where N is an integer greater than 1).

Turning to operation 1014, it shows causing the size of the group to be adjusted based on a number of pages mapped as writable. For example, in an embodiment the size of the group can be dynamically set based on the number of pages mapped as writable. In an embodiment, virtualization module 402 can determine how many pages have been mapped as writable and use a linear or non-linear function to increase or decrease the number of pages. For example, the size of the group may be initially set to 8 pages. Thus, virtualization module 402 can, for example, be configured to select a group of 8 pages that include the specific page and reduce the number such that, for example the group only includes the specific page by the last iteration. Virtualization module 402 can adjust the size of the group during subsequent passes on the pages and, for example, reduce the size of the group from 8 to 5.

Turning to operation 1016, which is a refinement of the operational procedure of FIG. 9, it shows that the group includes a group of guest physical pages adjacent to a guest physical address of the specific page. For example, and turning to FIG. 5, in an embodiment virtualization module 402 can group pages based on guest physical addresses. Thus, in this exemplary embodiment, when a guest physical page is accessed in a write operation, virtualization module 402 can remap it along with guest physical pages that are adjacent to it. As shown by iteration 2, when guest physical page 3 is accessed in a write operation, virtualization module 402 can identify the address of the guest physical pages adjacent to it (pages 1, 2, 4, and 5); and mark them as changed in tracking table 424.

Continuing with the description of FIG. 10, operation 1018, which is a refinement of the operational procedure of FIG. 9, shows that the group includes a group of guest virtual pages adjacent to a guest virtual address of the specific page. Turning to FIG. 6, in an embodiment virtualization module 402 can group pages based on guest virtual addresses. In this exemplary embodiment, when a guest virtual page is accessed in a write operation, virtualization module 402 can remap it along with guest virtual pages that that are adjacent to the guest physical page backing it. As shown by iteration 2, when guest virtual page 3 is accessed in a write operation, virtualization module 402 can identify the guest physical address backing it (guest physical page 1) and the addresses of the guest physical pages adjoining it (guest physical pages 0, 5, 6, and 7 in this example); map them as writable; and mark them as changed in tracking table 424.

Referring to operation 1020 of FIG. 10, it shows causing status information that identifies guest operating system storage IO jobs issued to a physical storage device to be changed to identify that the guest operating system storage IO jobs have not yet been issued to the physical storage device; and causing the status information identifying that the guest operating system storage IO jobs have not yet been issued to a physical storage device to be sent to the target computer system. For example, and turning to FIG. 8, information identifying IO jobs, i.e., requests to read or write to sectors of a physical storage, can be changed to reflect that issued IO jobs are have not yet been sent in virtualization storage service 702. In this example, the IO jobs have been issued to storage device 714; however, the information associated with them has been changed so that a state of virtualization storage service 702 can be instantly migrated to target computer system 408. Virtualization storage service 702 instantiated on the target computer system 408 can then reissue the IO jobs that were moved from issued IO job table 708 to queued IO job table.

After information about issued IO jobs has been moved from issued IO job table 708 to queued job table 706, and the state of virtualization storage service 702 has been sent to target computer system 408, virtualization storage service 702 can attempt to cancel the IO jobs issued to storage device 714. Or put another way, virtualization storage service 702 can attempt to cancel the IO jobs that were re-listed as pending and sent to target computer system 408. In a specific example, virtualization storage service 702 could send signals to storage driver 712 directing it to cancel the IO jobs. In some instances, storage device 712 may be able to cancel the IO jobs, i.e., the IO jobs are stored in a queue it controls, or a queue of the storage device 714 that can be accessed. In this instance, these IO jobs may be canceled. Alternately, virtualization module 402 could rely on a storage device's automatic cancellation of storage IO jobs during transfer of ownership from the source computer system 410 to the target computer system 410. In this example, control of the storage device 712 could be transferred as soon as the state of virtualization storage service 702 has been sent to target computer system 408.

When no more IO jobs are listed as issued or alternatively when the state of virtualization storage service 702 has been sent to target computer system 408, virtualization storage service 702 can report this information to virtualization module 402. In this example, virtualization module 402 can disconnect from physical storage device 714 and send a signal to target computer system 408. Virtualization module 430 on target computer system 408 can receive the signal and connect target virtual machine 404 to physical storage device 714. When target virtual machine 404 is running, a virtualization storage service on target computer system 408 can issue the IO jobs that listed as queued to storage device 714. In this example, some IO jobs will be reissued to storage device 714.

Turning to operation 1022, it shows causing compression of at least a portion of pages prior to sending them to the target computer system responsive to both current availability of logical processor cycles and an availability of uncompressed pages to send to the target computer system. For example, source computer system 410 can be configured to compress pages in the instant that an amount of compressed data available for immediate sending on the network drops below a buffer-threshold and logical processor cycles are available. In this example, virtualization module 402 could execute and copy a group of pages. In an exemplary embodiment, compression module 450 could be running with a low thread priority and can be configured to wait on an "event" indicating that the output queue of compressed data has less data than the buffer-threshold. When the compression thread runs, it can be scheduled to run on an otherwise idle logical processor.

Turning to operation 1024, it shows causing a first portion of the pages to be sent uncompressed responsive to a determination that an amount of compressed data available for sending is less than a threshold, called uncompressed-threshold in this description. For example, virtualization module 402 can be configured to send uncompressed data in the instance that an amount of available compressed data is less than a uncompressed-threshold. In a specific embodiment, the uncompressed-threshold value can be zero. Thus, in this embodiment, virtualization module 402 can be configured to send uncompressed data in the instance that compressed data is unavailable. In another embodiment, the uncompressed-threshold can be higher than zero. For example, the uncompressed-threshold could be set to 4 kilobytes or 1 megabyte. The uncompressed-threshold should be set to a value which is sufficient to achieve efficient delivery via the network.

In an exemplary embodiment, source computer system 410 can be configured to compress pages when the amount of compressed data available for immediate sending to target computer system 408 drops below a buffer-threshold amount of buffered compressed data. In response to the determination, compression module 450 can start compressing uncompressed data until the buffer-threshold amount of compressed data is reached or there is no more uncompressed data available to compress. In this exemplary embodiment, the buffer-threshold can be set to a value that allows for an amount of compressed data to be buffered. For example, the buffer-threshold can be set to a value such that whichever is the slower of compression module 450 or a network adaptor can be allowed to continuously process compressed data. That is, the buffer-threshold should be set to a sufficiently large value such that when compression module 450 is slower than the network adaptor, the compression module 450 can continuously compress data, and when the network adaptor is slower than compression module 450, the network adaptor can continuously send compressed data. In both cases, typical brief temporary interruptions in processing by the faster of the compression module 450 or the network adapter do not cause interruptions in processing by the slower of the two. Also, due to variable compression ratio, and variability of availability of CPU time, one skilled in the art will recognize that which is slower may change during the overall migration process.

Figure 11:
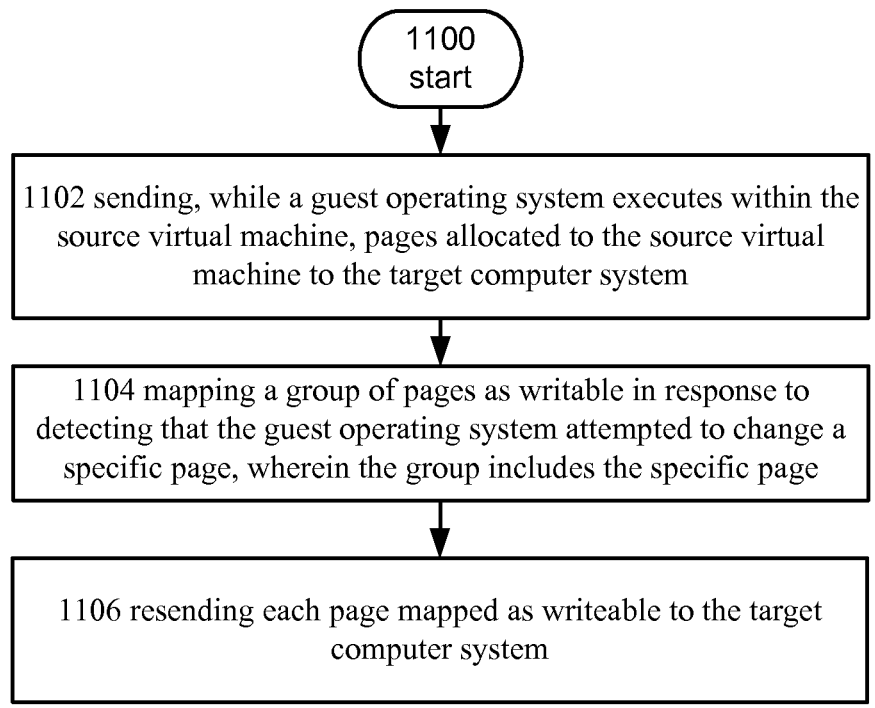
FIG. 11 depicts an operational procedure.

Turning now to FIG. 11, it illustrates an operational procedure for practicing aspects of the present disclosure including operations 1100, 1102, 1104, and 1106. Operation 1100 begins the operational procedure and operation 1102 shows sending, while a guest operating system executes within the source virtual machine, pages allocated to the source virtual machine to the target computer system. For example, and turning to FIG. 4, a network adaptor of source computer system 410 can be configured to transmit one or more packets of information indicative of the content in pages of memory allocated to source virtual machine 406. For example, virtualization module 402 can receive a request to migrate source virtual machine 406 and in response virtualization module 402 could remap each page of guest physical memory 420 as read-only; and copy each page of guest physical memory 420. Virtualization module 402 can then start sending each copied page to target computer system 408. As described above, guest operating system 412 can continue to run during this period and may attempt to write to one or more pages of guest physical memory 420.

Continuing with the description of FIG. 11, operation 1104 shows mapping a group of pages as writable in response to detecting that the guest operating system attempted to change a specific page, wherein the group includes the specific page. Turning to FIG. 4, virtualization module 402, for example, hypervisor microkernel 202, can execute and cause a group of pages to be mapped as writable. For example, guest operating system 412 can try to write to a specific page (which has been previously marked as read-only) and a protection fault will occur. Virtualization module 402 will run and handle the fault by identifying the address of the page associated with the fault; and remap a group of pages as writable. For example, FIG. 4 shows that guest operating system attempted to write to page 3, i.e., a fixed length block of memory having a starting guest physical address and an ending guest physical address. In response, virtualization module 402 can remap a group of pages, i.e., pages 2, 3, and 4, as writable. As shown by the figure, virtualization module 424 can also mark bits corresponding to pages 2, 3, and 4 in tracking table 424 to identify these pages. As one of skill in the art can appreciate, the number of pages in the group can be adjusted and could be a group of 1, i.e., only having the specific page in it, or it could be a very large number.

Turning to operation 1106, it shows resending each page mapped as writeable to the target computer system. For example, and turning back to FIG. 4, virtualization module 402 can be configured to resend each page that has been mapped as writable to target computer system 408. For example, after virtualization module 402 sends each page of system physical memory, virtualization module 402 can check tracking table 424 to determine whether any bits have been set. Continuing with the example above, virtualization module 402 can remap each page of guest physical memory as read-only that corresponds to tracking table 424, clear tracking table 424; copy the identified pages; and start sending the pages to target computer system 408.

Figure 12:
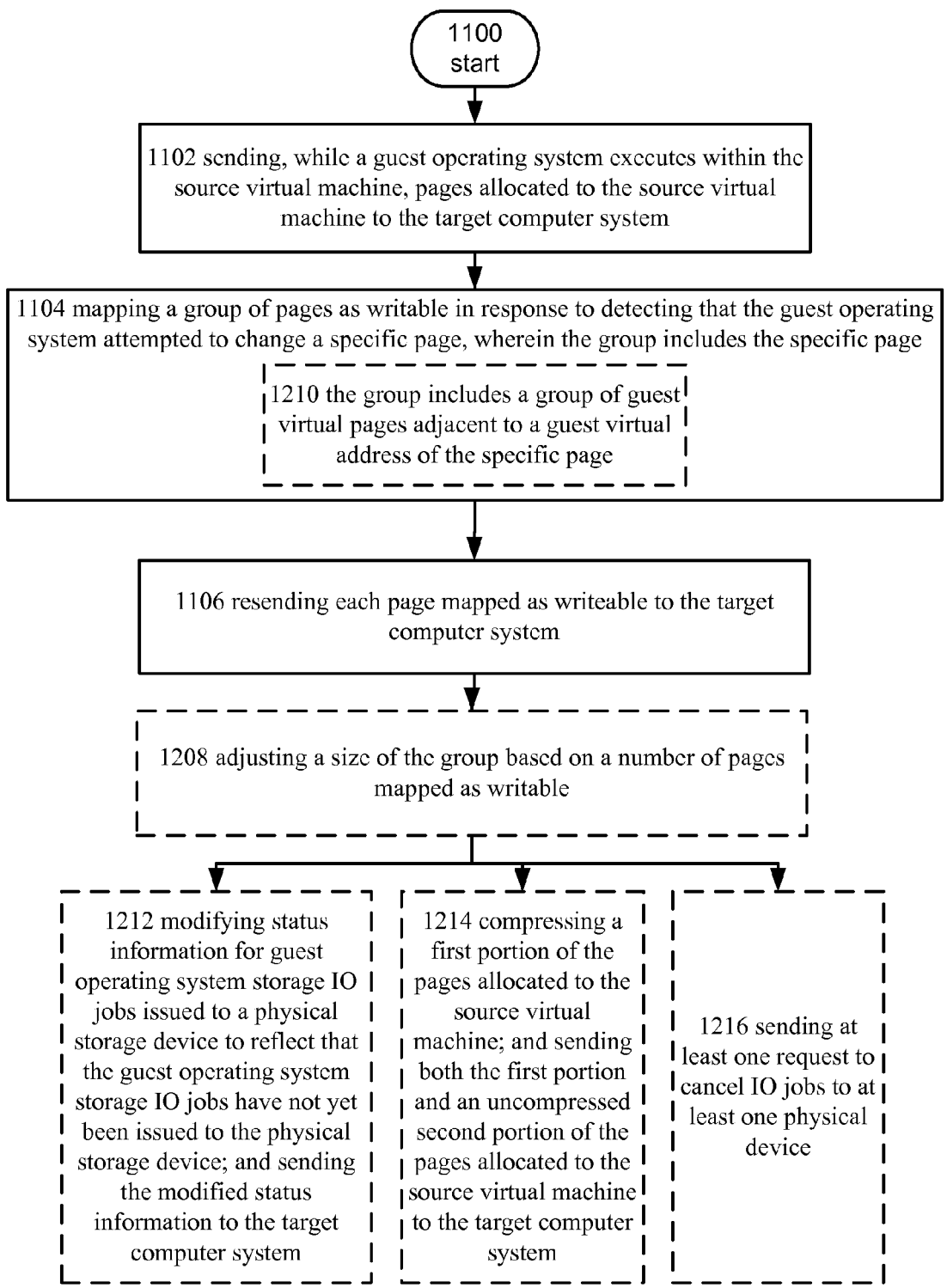
FIG. 12 depicts an alternative embodiment of the operational procedure of FIG. 11.

Turning now to FIG. 12, it illustrates an alternative embodiment of the operational procedure of FIG. 11 including operations 1208, 1210, 1212, 1214, and 1216. Turning to operation 1208, it shows adjusting a size of the group based on a number of pages mapped as writable. For example, in an embodiment the size of the group can be dynamically set based on the number of pages mapped as writable. In an embodiment, virtualization module 402 can determine how many pages have been mapped as writable and use a linear or non-linear function to increase or decrease the number of pages. For example, the size of the group may be initially set to 8 pages. Thus, virtualization module 402 can, for example, be configured to select a group of 8 pages that include the specific page and reduce the number such that, for example the group only includes the specific page by the last iteration. Virtualization module 402 can adjust the size of the group during subsequent passes on the pages and, for example, reduce the size of the group from 8 to 5.

Continuing with the description of FIG. 12, operation 1210, which is a refinement of operation 1104, shows that the group includes a group of guest virtual pages adjacent to a guest virtual address of the specific page. Turning to FIG. 6, in an embodiment virtualization module 402 can group pages based on guest virtual addresses. In this exemplary embodiment, when a guest virtual page is accessed in a write operation, virtualization module 402 can remap it along with guest virtual pages that that are adjacent to the guest physical page backing it. As shown by iteration 2, when guest virtual page 3 is accessed in a write operation, virtualization module 402 can identify the guest physical address backing it (guest physical page 1) and the addresses of the guest physical pages adjoining it (guest physical pages 0, 5, 6, and 7 in this example); map them as writable; and mark them as changed in tracking table 424.

Continuing with the description of FIG. 12, operation 1212 shows modifying status information for guest operating system storage IO jobs issued to a physical storage device to reflect that the guest operating system storage IO jobs have not yet been issued to the physical storage device; and sending the modified status information to the target computer system. For example, and turning to FIGS. 7 and 8, information identifying IO jobs, i.e., requests to read or write to sectors of a physical storage, can be changed to reflect that issued IO jobs are queued in the virtualization storage service 702. In this example, the IO jobs have been issued to storage device 714; however, the information associated with them has been changed so that a state of virtualization storage service 702 can be quickly ascertained instead of having to wait until all IO job are complete. A virtualization storage service 702 instantiated on the target computer system can then reissue the IO jobs that were moved from issued IO job table 708 to queued IO job table 706.

Continuing with the description of FIG. 12, operation 1214 shows compressing a first portion of the pages allocated to the source virtual machine; and sending both the first portion and an uncompressed second portion of the pages allocated to the source virtual machine to the target computer system. In an exemplary embodiment, source computer system 410 can be configured to compress pages when the amount of compressed data available for immediate sending to target computer system 408 drops below a buffer-threshold amount of buffered compressed data. In response to the determination, compression module 450 can start compressing uncompressed data until the buffer-threshold amount of compressed data is reached or there is no more uncompressed data available to compress. In this exemplary embodiment, the buffer-threshold can be set to a value that allows for an amount of compressed data to be buffered. For example, the buffer-threshold can be set to a value such that whichever is the slower of compression module 450 or a network adaptor can be allowed to continuously process compressed data. That is, when compression module 450 is slower than the network adaptor, the compression module 450 can continuously compress data, and when the network adaptor is slower than compression module 450, the network adaptor can continuously send compressed data.

Virtualization module 402 can be configured to send uncompressed data in the instance that an amount of available compressed data is less than an uncompressed-threshold. In a specific embodiment, the uncompressed-threshold value can be zero. Thus, in this embodiment, virtualization module 402 can be configured to send uncompressed data in the instance that compressed data is unavailable, otherwise it can sent compressed data.

Continuing with the description of FIG. 12, operation 1216 shows sending at least one request to cancel IO jobs to at least one physical device. For example, in an embodiment virtualization module 402 can send one or more requests to physical devices, e.g., network cards, graphics cards, storage devices, to cancel and IO jobs that have been issued for source virtual machine 406. In this example embodiment, each physical device virtualized for source virtual machine 406 can have an associated virtualization service provider with tables similar to those described in FIG. 8. In a specific example, and turning back to FIG. 8, after information about issued IO jobs has been moved from issued IO job table 708 to queued job table 706 and the state of virtualization storage service 702 has been sent to target computer system, virtualization storage service 702 can attempt to cancel the IO jobs issued to the storage device 714. Or put another way, virtualization storage service 702 can attempt to cancel the IO jobs that where just re-listed as pending.

Figure 13:
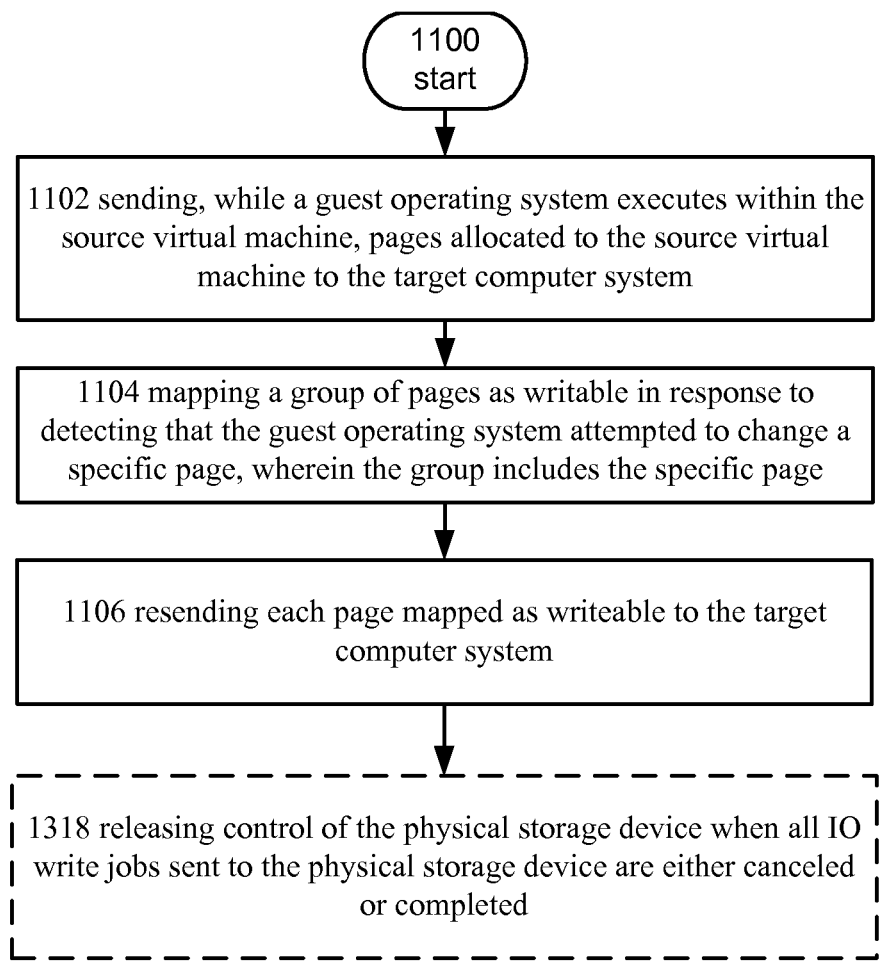
FIG. 13 depicts an alternative embodiment of the operational procedure of FIG. 12.

Turning now to FIG. 13, it illustrates an alternative embodiment of the operational procedure illustrated by FIG. 12 including operation 1318 which shows releasing control of the physical storage device when all IO write jobs sent to the physical storage device are either canceled or completed. For example, in an embodiment virtualization storage service 702 can report that no IO jobs are outstanding to virtualization module 402. In this example, virtualization module 402 can disconnect from physical storage device 714 and send a signal to target computer system 408. Virtualization module 430 on target computer system 408 can receive the signal and connect target virtual machine 404 to physical storage device 714. When target virtual machine 404 is running, a virtualization storage service on target computer system 408 can reissue the IO jobs in queued IO job table 706.

Figure 14:
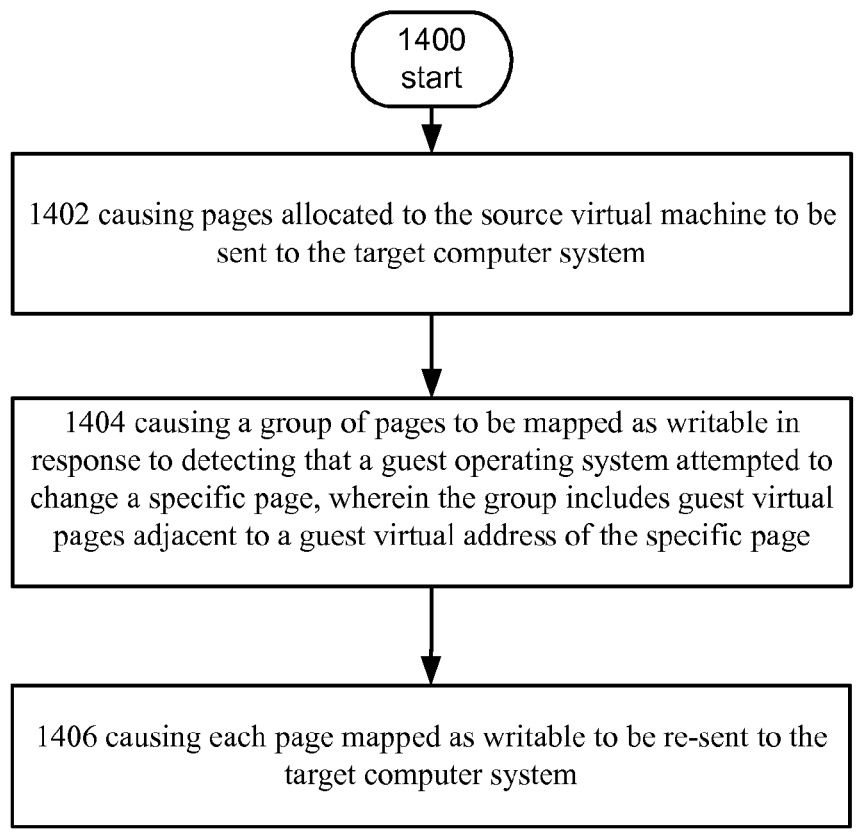
FIG. 14 depicts an operational procedure.

Turning now to FIG. 14, it illustrates an operational procedure including operations 1400, 1402, 1404, and 1406. Operation 1402 shows causing pages allocated to the source virtual machine to be sent to the target computer system. For example, and turning to FIG. 4, a network adaptor of source computer system 410 can be configured to send one or more packets of information indicative of the content in pages of memory allocated to source virtual machine 406. For example, virtualization module 402 can receive a quest to migrate virtual machine 406. In response, virtualization module 402 can cause each page of guest physical memory 420 mapped as read-only; copied; and sent to target computer system 408.

Operation 1404 shows causing a group of pages to be mapped as writable in response to detecting that a guest operating system attempted to change a specific page, wherein the group includes guest virtual pages adjacent to a guest virtual address of the specific page. Turning to FIG. 4 and FIG. 5, virtualization module 402, for example, hypervisor 302, can execute and cause a group of pages to be mapped as writable. For example, guest operating system 412 can try to write to a specific page (which has been previously marked as read-only) and a protection fault will occur. Virtualization module 402 can run and handle the fault by identifying the address of the specific page; and remap a group of pages as writable. In this example, the group can be formed to include guest virtual pages adjacent to the guest virtual address guest operating system 412 attempted to change. As shown by FIG.

6, guest operating system 412 can attempt to change page 3 and a page fault can be generated. Virtualization module 402 can receive the fault and determine that guest physical page 1 backs guest virtual page 3. Virtualization module 402 can then walk a page table mapping guest physical pages to guest virtual pages and determine that the pages adjacent to guest virtual page 3 are guest virtual pages 1, 2, 4, and 5. Virtualization module 402 can then determine that the guest physical pages backing these pages are guest physical pages 0, 5, 6, and 7. Virtualization module 402 can then remap a group of pages including guest physical pages 0, 1, 5, 6, and 7 as writable. As one of skill in the art can appreciate, the number of pages in the group can be adjusted and this example is merely for illustration purposes.

Operation 1406 shows causing each page mapped as writable to be re-sent to the target computer system. For example, and turning back to FIG. 4, virtualization module 402 can be configured to resend each page that has been mapped as writable to target computer system 408. For example, after virtualization module 402 sends each page of guest physical memory containing guest operating system data, virtualization module 402 can check tracking table 424 to determine whether any bits have been set. Continuing with the example above, virtualization module 402 can remap each page of guest physical memory as read-only; copy pages associated with the bits (system physical pages system physical pages 0, 1, 5, 6, and 7 in this example); clear tracking table 424; and start sending the pages.

Figure 15:
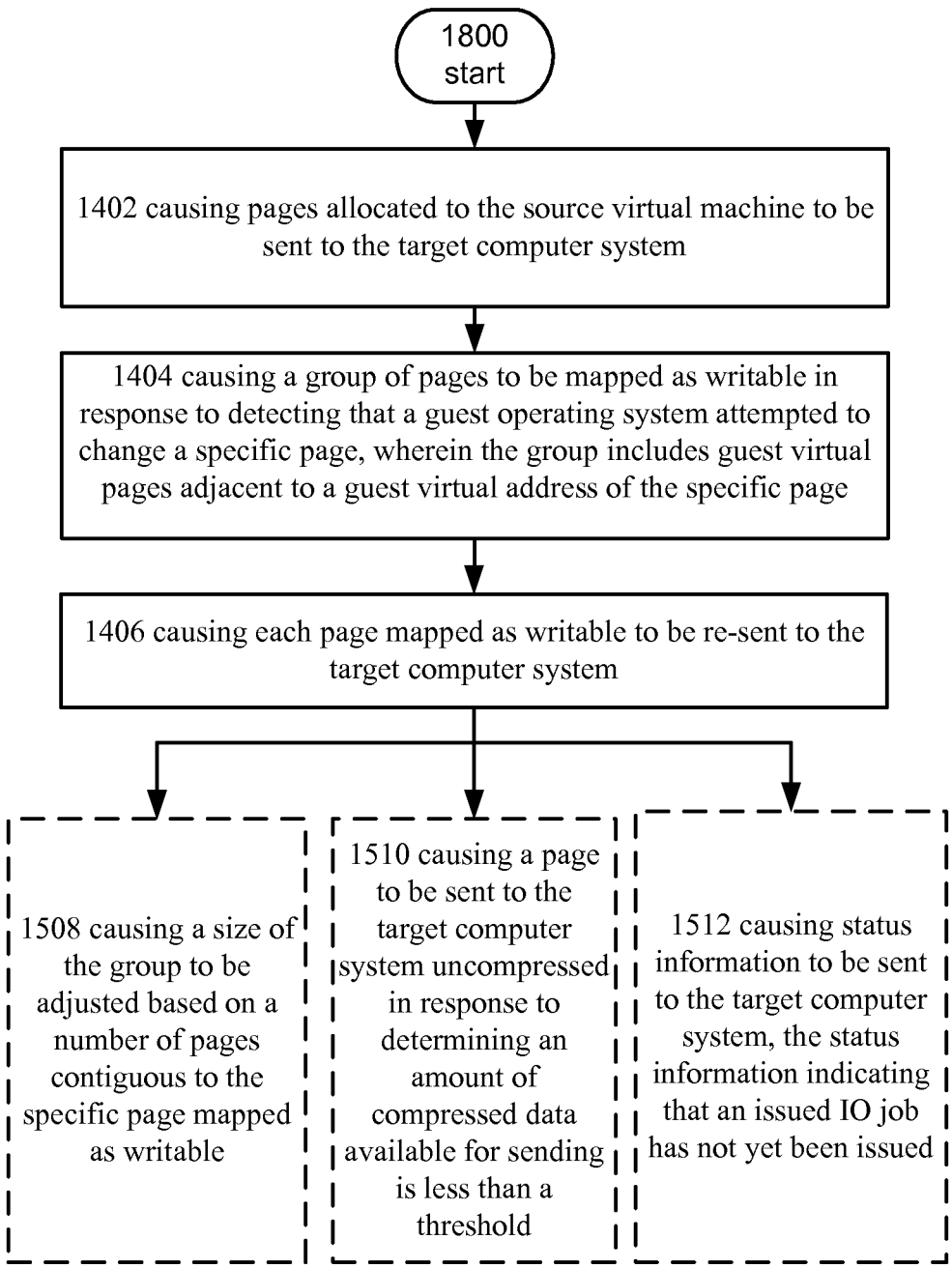
FIG. 15 depicts an alternative embodiment of the operational procedure of FIG. 14.

Turning now to FIG. 15, it shows an alternative embodiment of the operational procedure of FIG. 14. FIG. 15 includes the additional operations 1508, 1510, and 1512. Operation 1508 shows causing a size of the group to be adjusted based on a number of pages contiguous to the specific page mapped as writable. For example, the size of the group can be dynamically set based on the number of pages contiguous to the specific page mapped as writable. In this example embodiment, the size of the group can increase and decrease based on the number of contiguous pages mapped as writable in tracking table 424. For example, virtualization module 402 can be configured to adapt the size of the group based on the number of contiguous pages marked as writable when tracking table 424 is accessed. In this exemplary embodiment, a first page may be changed by guest operating system 412 and the first page may be mapped writable. If, for example, guest operating system 412 changes a contiguous page, virtualization module 402 can determine that the first page is mapped writable and adapt the size of the group from 1 page to N pages (where N is an integer greater than 1).

Operation 1510 shows causing a page to be sent to the target computer system uncompressed in response to determining that an amount of compressed data available for sending is less than a threshold, called uncompressed-threshold in this description. For example, virtualization module 402 can be configured to send uncompressed data in the instance that an amount of available compressed data is less than an uncompressed-threshold. In a specific embodiment, the uncompressed-threshold value can be zero. Thus, in this embodiment, virtualization module 402 can be configured to send uncompressed data in the instance that compressed data is unavailable, otherwise it can sent compressed data.

In an exemplary embodiment, source computer system 410 can be configured to compress pages when the amount of compressed data available for immediate sending to target computer system 408 drops below a buffer-threshold amount of buffered compressed data. In response to the determination, compression module 450 can start compressing uncompressed data until the buffer-threshold amount of compressed data is reached or there is no more uncompressed data available to compress. In this exemplary embodiment, the buffer-threshold can be set to a value that allows for an amount of compressed data to be buffered. For example, the buffer-threshold can be set to a value such that whichever is the slower of compression module 450 or a network adaptor can be allowed to continuously process compressed data. That is, when compression module 450 is slower than the network adaptor, the compression module 450 can continuously compress data, and when the network adaptor is slower than compression module 450, the network adaptor can continuously send compressed data.

Operation 1512 shows causing status information to be sent to the target computer system, the status information indicating that an issued IO job has not yet been issued. For example, and turning to FIG. 8, information identifying IO jobs, i.e., requests to read or write to sectors of a physical storage, can be changed to reflect that issued IO jobs are have not yet been sent in virtualization storage service 702. In this example, the IO jobs have been issued to storage device 714; however, the information associated with them has been changed so that a state of virtualization storage service 702 can be instantly migrated to target computer system 408. Virtualization storage service 702 instantiated on the target computer system 408 can then reissue the IO jobs that were moved from issued IO job table 708 to queued IO job table.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A system operable to migrate a source virtual machine from a source computer system to a target computer system, the system comprising:
   a source computer system including at least one logical processor coupled to a computer-readable storage medium, the computer-readable storage medium comprising:
   instructions that when executed by the source computer system cause each page of guest physical memory allocated to the source virtual machine to be mapped read-only while a guest operating system executes in the source virtual machine;
   instructions that when executed by the source computer system cause each page mapped as read-only to be sent to the target computer system while the guest operating system executes;
   instructions that when executed by the source computer system cause a group of contiguous pages to be mapped as writable in response to detecting that the guest operating system attempted to change a specific page, the group including at least the specific page and an unchanged page, the size of the group being set based on a dynamic counter associated with re-sending pages to the target computer system; and instructions that when executed by the source computer system cause the pages mapped as writeable to be re-sent to the target computer system.

2. The system of claim 1, wherein the computer-readable storage medium of the host system further comprises:

instructions that when executed by the source computer system cause the size of the group to be statically set.

3. The system of claim 1, wherein the computer-readable storage medium of the host system further comprises:

instructions that when executed by the source computer system cause the size of the group to be adjusted based on a number of contiguous pages currently mapped as writable.

4. The system of claim 1, wherein the computer-readable storage medium of the host system further comprises:

instructions that when executed by the source computer system cause the size of the group to be adjusted based on a number of pages mapped as writable.

5. The system of claim 1, wherein the group includes a group of guest physical pages adjacent to a guest physical address of the specific page.

6. The system of claim 1, wherein the group includes a group of guest virtual pages adjacent to a guest virtual address of the specific page.

7. The computer system of claim 1, wherein the computer-readable storage medium further comprises:

instructions that when executed by the source computer system cause status information that identifies guest operating system storage IO jobs issued to a physical storage device to be changed to identify that the guest operating system storage IO jobs have not yet been issued to the physical storage device; and instructions that when executed by the source computer system cause the status information identifying that the guest operating system storage IO jobs have not yet been issued to a physical storage device to be sent to the target computer system.

8. The computer system of claim 1, wherein the computer-readable storage medium further comprises:

instructions that when executed by the source computer system cause compression of at least a portion of pages prior to sending them to the target computer system responsive to both current availability of logical processor cycles and an availability of uncompressed pages to send to the target computer system.

9. The computer system of claim 1, wherein the computer-readable storage medium further comprises:

instructions that when executed by the source computer system cause a first portion of the pages to be sent uncompressed responsive to a determination that an amount of compressed data available for sending is less than a threshold.

10. A computer-implemented method for migrating a source virtual machine executing within a source computer system to a target computer system, comprising:

sending, while a guest operating system executes within the source virtual machine, pages allocated to the source virtual machine to the target computer system;

mapping a group of contiguous pages as writable in response to detecting that the guest operating system attempted to change a specific page, the group including at least the specific page and an unchanged page, the size of the group being set based on a dynamic counter associated with re-sending pages to the target computer system; and resending each page mapped as writeable to the target computer system.

11. The computer-implemented method of claim 10, further comprising:

adjusting a size of the group based on a number of pages mapped as writable.

12. The computer-implemented method of claim 10, wherein the group includes a group of guest virtual pages adjacent to a guest virtual address of the specific page.

13. The computer-implemented method of claim 10, further comprising:

modifying status information for guest operating system storage IO jobs issued to a physical storage device to reflect that the guest operating system storage IO jobs have not yet been issued to the physical storage device; and sending the modified status information to the target computer system.

14. The computer-implemented method of claim 10, further comprising:

compressing a first portion of the pages allocated to the source virtual machine; and sending both the first portion and an uncompressed second portion of the pages allocated to the source virtual machine to the target computer system.

15. The computer-implemented method of claim 10, further comprising:

sending at least one request to cancel IO jobs to at least one physical device.

16. The computer-implemented method of claim 13, further comprising:

releasing control of the physical storage device when all IO write jobs sent to the physical storage device are either canceled or completed.

17. A computer-readable storage medium including instructions for migrating a source virtual machine from a source computer system to a target computer system, the computer-readable storage medium comprising:

instructions that when executed by a source computer system cause pages allocated to the source virtual machine to be sent to the target computer system;

instructions that when executed by a source computer system cause a group of contiguous pages to be mapped as writable in response to detecting that a guest operating system attempted to change a specific page, the group including at least the specific page and an unchanged page the size of the group being set based on a dynamic counter associated with re-sending pages to the target computer system; and instructions that when executed by the source computer system cause each page mapped as writable to be re-sent to the target computer system.

18. The computer-readable medium of claim 17, further comprising:

instructions that when executed by the source computer system cause a size of the group to be adjusted based on a number of pages contiguous to the specific page mapped as writable.

19. The computer-readable storage medium of claim 17, further comprising:

instructions that when executed by the source computer system cause a page to be sent to the target computer system uncompressed in response to determining that an amount of compressed data available for sending is less than a threshold.

20. The computer-readable storage medium of claim 17, further comprising:

instructions that when executed by the source computer system cause status information to be sent to the target computer system, the status information indicating that an issued IO job has not yet been issued.

* * * * *